United States Patent
Tsuboi et al.

(10) Patent No.: US 12,075,510 B2
(45) Date of Patent: Aug. 27, 2024

(54) TERMINAL APPARATUS, BASE STATION APPARATUS, AND METHOD

(71) Applicant: SHARP KABUSHIKI KAISHA, Sakai (JP)

(72) Inventors: Hidekazu Tsuboi, Sakai (JP); Shohei Yamada, Sakai (JP); Kyosuke Inoue, Sakai (JP); Takuma Kawano, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 387 days.

(21) Appl. No.: 17/690,542

(22) Filed: Mar. 9, 2022

(65) Prior Publication Data

US 2023/0292392 A1    Sep. 14, 2023

(30) Foreign Application Priority Data

Jan. 11, 2022  (JP) .................................. 2022-002633

(51) Int. Cl.
*H04W 76/27*    (2018.01)
(52) U.S. Cl.
CPC .................................. *H04W 76/27* (2018.02)
(58) Field of Classification Search
CPC ..... H04W 76/15; H04W 76/20; H04W 76/27; H04W 76/34; H04W 52/0206; H04W 52/0209; H04W 52/0225; H04W 52/0229; Y02D 30/70
See application file for complete search history.

(56) References Cited

U.S. PATENT DOCUMENTS

| | | | | |
|---|---|---|---|---|
| 2019/0356460 A1* | 11/2019 | Tsuboi | ................. | H04W 72/04 |
| 2020/0077288 A1* | 3/2020 | Tsuboi | ................. | H04W 76/16 |
| 2020/0077312 A1* | 3/2020 | Tsuboi | ................. | H04W 76/15 |
| 2020/0169906 A1* | 5/2020 | Tsuboi | ................. | H04W 76/27 |
| 2021/0392537 A1* | 12/2021 | Da Silva | ............... | H04W 76/38 |
| 2022/0264404 A1* | 8/2022 | Xu | ........................ | H04W 76/27 |
| 2023/0026279 A1* | 1/2023 | Kumar | ................. | H04W 76/15 |

(Continued)

FOREIGN PATENT DOCUMENTS

| | | | | |
|---|---|---|---|---|
| CN | 113475109 A | * | 10/2021 | ............ H04W 24/10 |
| CN | 116349387 A | * | 6/2023 | ............ H04W 36/36 |

(Continued)

OTHER PUBLICATIONS

Zte Corporation et al., "Framework of SCG deactivation and activation", R2-2006900 3GPP TSG-RAN WG2 Meeting #111 electronic, e-meeting, Aug. 17-28, 2020.

(Continued)

*Primary Examiner* — Chi H Pham
*Assistant Examiner* — Vladislav Y Agureyev
(74) *Attorney, Agent, or Firm* — ScienBiziP, P.C.

(57) ABSTRACT

A terminal apparatus determines whether information (first information) indicating whether a state of a secondary cell group is to be changed based on scg-State is included in the RRC signaling, in a case that the first information is not included in the RRC signaling, the state of the secondary cell group is changed based on whether the scg-State is included in the RRC signaling, and in a case that the first information is included in the RRC signaling, the state of the secondary cell group is not changed based on whether the scg-State is included in the RRC signaling.

3 Claims, 12 Drawing Sheets

(56) References Cited

U.S. PATENT DOCUMENTS

| | | | |
|---|---|---|---|
| 2023/0180313 A1* | 6/2023 | Freda | H04W 76/14 |
| | | | 370/310 |
| 2023/0199676 A1* | 6/2023 | Palle Venkata | H04W 76/19 |
| 2023/0199881 A1* | 6/2023 | Freda | H04L 5/0055 |
| | | | 370/329 |
| 2024/0049151 A1* | 2/2024 | Oh | H04W 52/367 |
| 2024/0064785 A1* | 2/2024 | Tsuboi | H04W 72/04 |
| 2024/0072984 A1* | 2/2024 | Wu | H04W 76/22 |
| 2024/0073982 A1* | 2/2024 | Wallentin | H04W 76/15 |
| 2024/0147332 A1* | 5/2024 | Zhang | H04W 36/0058 |

FOREIGN PATENT DOCUMENTS

| | | | | |
|---|---|---|---|---|
| EP | 3920603 A1 | 12/2021 | | |
| WO | WO-2018116910 A1 * | 6/2018 | | H04L 5/0094 |
| WO | 2021/184418 A1 | 9/2021 | | |
| WO | WO-2021207505 A1 * | 10/2021 | | H04W 76/14 |
| WO | WO-2022086243 A1 * | 4/2022 | | H04W 52/0212 |
| WO | WO-2022091070 A1 * | 5/2022 | | H04W 28/20 |
| WO | WO-2022190334 A1 * | 9/2022 | | |

OTHER PUBLICATIONS

Ericsson, "Efficient SCG deactivation", R2-2110516 3GPP TSG-RAN WG2 #116e, Electronic meeting, Nov. 1-12, 2021.
Huawei et al., "Introduction of efficient SCG activation/deactivation", R2-2111638 3GPP TSG-RAN-WG2 Meeting #116-e, Electronic meeting, Nov. 1-12, 2021.

* cited by examiner

```
CellGroupConfig ::=          SEQUENCE {
    <PARTLY OMITTED>
    spCellConfig             SpCellConfig        OPTIONAL,
    <PARTLY OMITTED>
}
SpCellConfig ::=             SEQUENCE {
    <PARTLY OMITTED>
    deactivatedSCG-Config-r17    SetupRelease { DeactivatedSCG-Config-r17 }   OPTIONAL,
    tci-Info-r17             TCI-Info            OPTIONAL,
    <PARTLY OMITTED>
}
DeactivatedSCG-Config-r17 ::=   SEQUENCE {
    bfd-and-RLM              BOOLEAN,
    ...
}
TCI-Info ::=                 SEQUENCE {
    bwp-Id-r17               BWP-Id,
    ...
}
```

FIG. 7

```
<OMITTED>
SCG-Configuration-r12 ::=    CHOICE {
  release                      NULL,
  setup                        SEQUENCE {
    scg-ConfigPartMCG-r12         SEQUENCE {
      scg-Counter-r12                INTEGER (0.. 65535)        OPTIONAL,
      powerCoordinationInfo-r12      PowerCoordinationInfo-r12  OPTIONAL,
      ...
    }                                                           OPTIONAL,
    scg-ConfigPartSCG-r12         SCG-ConfigPartSCG-r12         OPTIONAL
  }
}

<PARTLY OMITTED>
SCG-ConfigPartSCG-r12 ::=       SEQUENCE {
  radioResourceConfigDedicatedSCG-r12   RadioResourceConfigDedicatedSCG-r12 OPTIONAL,
  sCellToReleaseListSCG-r12             SCellToReleaseList-r10              OPTIONAL,
  pSCellToAddMod-r12                    PSCellToAddMod-r12                  OPTIONAL,
  sCellToAddModListSCG-r12              SCellToAddModList-r10               OPTIONAL,
  mobilityControlInfoSCG-r12            MobilityControlInfoSCG-r12          OPTIONAL,
<PARTLY OMITTED>
<OMITTED>
}
```

FIG. 8

```
RRCReconfiguration ::=          SEQUENCE {
  <OMITTED>
  scg-State      ENUMERATED {deactivated}   OPTIONAL,
  keepScgState   ENUMERATED {keep}          OPTIONAL,
  <OMITTED>
}
```

FIG. 11

```
RRCReconfiguration ::=    SEQUENCE {
  <OMITTED>
  conditionalReconfiguration ConditionalReconfiguration OPTIONAL,
  <OMITTED>
}

ConditionalReconfiguration ::=  SEQUENCE {
  <OMITTED>
  condReconfigToRemoveList   CondReconfigToRemoveList OPTIONAL,
  condReconfigToAddModList   CondReconfigToAddModList OPTIONAL,
  <OMITTED>
}

CondReconfigToRemoveList ::= SEQUENCE (SIZE (1..maxNrofCondCells)) OF CondReconfigId CondReconfigToAddModList ::= SEQUENCE (SIZE (1..maxNrofCondCells)) OF CondReconfigToAddMod CondReconfigToAddMod ::=   SEQUENCE {
  <OMITTED>
  condReconfigId     CondReconfigId,
  condExecutionCond   SEQUENCE (SIZE (1..2)) OF MeasId OPTIONAL,
  condRRCReconfig    OCTET STRING (CONTAINING RRCReconfiguration) OPTIONAL,
  <OMITTED>
  condExecutionCondSN OCTET STRING (CONTAINING CondReconfigExecCondSN) OPTIONAL,
  <OMITTED>
  keepScgState     ENUMERATED {keep}     OPTIONAL,
  <OMITTED>
}
```

FIG. 12

```
RRCReconfiguration ::=          SEQUENCE {
<OMITTED>
conditionalReconfiguration  ConditionalReconfiguration  OPTIONAL,
<OMITTED>
}
ConditionalReconfiguration ::=  SEQUENCE {
<OMITTED>
condReconfigToRemoveList    CondReconfigToRemoveList  OPTIONAL,
condReconfigToAddModList    CondReconfigToAddModList  OPTIONAL,
<OMITTED>
}
CondReconfigToRemoveList ::=  SEQUENCE (SIZE (1..maxNrofCondCells)) OF CondReconfigId
CondReconfigToAddModList ::= SEQUENCE (SIZE (1..maxNrofCondCells)) OF CondReconfigToAddMod CondReconfigToAddMod ::=   SEQUENCE {
<OMITTED>
condReconfigId      CondReconfigId,
condExecutionCond   SEQUENCE (SIZE (1..2)) OF MeasId OPTIONAL,
condRRCReconfig     OCTET STRING (CONTAINING RRCReconfiguration) OPTIONAL,
<OMITTED>
condExecutionCondSN OCTET STRING (CONTAINING CondReconfigExecCondSN) OPTIONAL,
<OMITTED>
keepScgState    ENUMERATED  {keep}           OPTIONAL,
<OMITTED>
}
```

FIG. 13

TERMINAL APPARATUS, BASE STATION APPARATUS, AND METHOD

TECHNICAL FIELD

The present invention relates to a terminal apparatus, a base station apparatus, and a method.

BACKGROUND ART

The 3rd Generation Partnership Project (3GPP), a standardization project for cellular mobile communication systems has performed the technical study and standardization of cellular mobile communication systems including radio access, core networks, services, and the like.

For example, the 3GPP has started the technical study and standardization of Evolved Universal Terrestrial Radio Access (E-UTRA) as a radio access technology (RAT) for the 3.9-th and 4th generation cellular mobile communication systems. The technical study and standardization of advanced technologies of E-UTRA are still underway in the 3GPP. Further, E-UTRA is also referred to as Long Term Evolution (LTE), and its advanced technologies are also called LTE-Advanced (LTE-A) and LTE-Advanced Pro (LTE-A Pro).

In addition, the 3GPP has started the technical study and standardization of New Radio (NR) or NR Radio access as a radio access technology (RAT) for the 5th generation (5G) cellular mobile communication systems. The technical study and standardization of advanced technologies of NR are still underway in the 3GPP.

CITATION LIST

NPL

NPL 1: 3GPP TS 38.300 v16.4.0, "NR; NR and NG-RAN Overall description; Stage 2", pp 10-134

NPL 2: 3GPP TS 36.300 v16.4.0, "Evolved Universal Terrestrial Radio Access (E-UTRA) and Evolved Universal Terrestrial Radio Access Network (E-UTRAN); Overall description; Stage 2", pp 19-362

NPL 3: 3GPP TS 38.331 v16.3.1, "NR; Radio Resource Control (RRC); Protocol specifications", pp 21-881

NPL 4: 3GPP TS 36.331 v16.3.0, "Evolved Universal Terrestrial Radio Access (E-UTRA); Radio Resource Control (RRC); Protocol specifications", pp 25-1015

NPL 5: 3GPP TS 37.340 v16.4.0, "Evolved Universal Terrestrial Radio Access (E-UTRA) and NR; Multi-Connectivity; Stage 2", pp 7-77

NPL 6: 3GPP TS 38.321 v16.3.0, "NR; Medium Access Control (MAC) protocol specification", pp 8-152

NPL: 7 R2-2111638, "Introduction of SCG deactivation"

SUMMARY OF INVENTION

Technical Problem

In order to enable large capacity data communication by an advanced technique of NR, there is a technique of dual connectivity (also referred to as multi-connectivity) in which one or more base station apparatuses and terminal apparatuses communicate with each other using multiple cell groups. In order to realize communication in each cell group in this dual connectivity, the terminal apparatuses need to monitor the presence or absence of a message addressed to themselves in each cell group. The terminal apparatuses need to monitor multiple cell groups at all times to enable them to perform low latency communication in a case that large capacity data communication occurs, which causes a problem in that a large amount of power is consumed. For this reason, a study on a technique of performing or stopping monitoring of some cell groups with a low frequency (cell group deactivation technique) has been started.

NPL 7 is a revised version of the specification regarding activation of cell groups. However, terminal apparatuses cannot perform efficient mobility in mobility based on conditional reconfiguration without reflecting a determination considering conditioned reconfiguration in the application of an RRC reconfiguration message, and subsequently studied since the NR Release 18 (also referred to as 5G Advanced).

An aspect of the present invention has been made in light of the above-described circumstances, and an objective of the present invention is to provide a terminal apparatus, a base station apparatus, and a method that can efficiently control communication.

Solution to Problem

In order to accomplish the objective described above, an aspect of the present invention is contrived to provide the following means. That is, an aspect of the present invention is a terminal apparatus including a receiver configured to receive RRC signaling, and a processing unit, in which the processing unit determines whether information (first information) indicating whether a state of a secondary cell group is to be changed based on information (scg-State) indicating configuration of a state of the secondary cell group is included in the RRC signaling, in a case that the first information is not included in the RRC signaling, the state of the secondary cell group is determined to be a deactivated state based on the scg-State being included in the RRC signaling, and the state of the secondary cell group is determined to be an activated state based on the scg-State not being included in the RRC signaling, and in a case that the first information is included in the RRC signaling, the state of the secondary cell group is not changed based on whether the scg-State is included in the RRC signaling.

In addition, an aspect of the present invention is a base station apparatus for communicating with a terminal apparatus, the base station apparatus including a transmitter configured to transmit RRC signaling, and a processing unit, in which the terminal apparatus is notified that a state of a secondary cell group is to be determined to be a deactivated state based on first information not being included and scg-State being included in the RRC signaling, the terminal apparatus is notified that a state of the secondary cell group is to be determined to be an activated state based on the first information not being included and the scg-State not being included in the RRC signaling, and the terminal apparatus is notified that a state of the secondary cell group is not to be changed based on the first information being included in the RRC signaling.

In addition, an aspect of the present invention is a method applied to a terminal apparatus, the method including receiving RRC signaling, and processing the RRC signaling, in which it is determined whether information (first information) indicating whether a state of a secondary cell group is to be changed based on information (scg-State) indicating configuration of a state of the secondary cell group is included in the RRC signaling, in a case that the first information is not included in the RRC signaling, the state of the secondary cell group is determined to be a deactivated state based on the scg-State being included in the RRC signaling, and the state of the secondary cell group is determined to be an activated state based on the scg-State not being included in the RRC signaling, and in a case that the first information is included in the RRC signaling, the state of the secondary cell group is not changed based on whether the scg-State is included in the RRC signaling.

In addition, one aspect of the present invention is an integrated circuit implemented in a terminal apparatus, which causes the terminal apparatus to perform receiving RRC signaling and processing the RRC signaling, in which it is determined whether information (first information) indicating whether a state of a secondary cell group is to be changed based on information (scg-State) indicating configuration of a state of the secondary cell group is included in the RRC signaling, in a case that the first information is not included in the RRC signaling, the state of the secondary cell group is determined to be a deactivated state based on the scg-State being included in the RRC signaling, and the state of the secondary cell group is determined to be an activated state based on the scg-State not being included in the RRC signaling, and in a case that the first information is included in the RRC signaling, the state of the secondary cell group is not changed based on whether the scg-State is included in the RRC signaling.

These comprehensive or specific aspects may be implemented in a system, an apparatus, a method, an integrated circuit, a computer program, or a recording medium, or may be implemented in any combination of systems, apparatuses, methods, integrated circuits, computer programs, and recording media.

Advantageous Effects of Invention

According to an aspect of the present invention, the terminal apparatus, the base station apparatus, the method, and the integrated circuit can implement an efficient communication control process.

BRIEF DESCRIPTION OF DRAWINGS

FIG. 7 illustrates an exemplary description of ASN.1 included in a message regarding reconfiguration of an RRC connection in NR according to the present embodiment.

FIG. 8 illustrates an exemplary description of ASN.1 included in a message regarding reconfiguration of an RRC connection in E-UTRA according to the present embodiment.

FIG. 11 illustrates an exemplary description of ASN.1 of an RRC reconfiguration message according to the present embodiment.

FIG. 12 illustrates an exemplary description of ASN.1 of an RRC reconfiguration message including conditional reconfiguration information elements according to the present embodiment.

FIG. 13 illustrates an exemplary description of ASN.1 of an RRC reconfiguration message including conditional reconfiguration information elements according to the present embodiment.

DESCRIPTION OF EMBODIMENTS

A present embodiment of the invention will be described below in detail with reference to the drawings.

LTE (and LTE-A and LTE-A Pro) and NR may be defined as different radio access technologies (RATs). In addition, NR may be defined as a technique included in LTE. In addition, LTE may be defined as a technique included in NR. In addition, LTE that is connectable to NR in Multi-Radio Dual Connectivity (MR-DC) may be distinguished from existing LTE. In addition, LTE in which 5GC is used as a core network (CN) may be distinguished from existing LTE in which EPC is used as a core network. Further, existing LTE may be LTE that does not implement the techniques standardized from Release 15 by the 3GPP. The present embodiment may be applied to NR, LTE and other RATs. Although the present embodiment will be described using terms related to LTE and NR in the following description, the present embodiment may be applied to other techniques using other terms. In addition, the term "E-UTRA" used in the present embodiment may be replaced with the term "LTE", and the term "LTE" may be replaced with the term "E-UTRA".

Further, although the name of each node or entity in a case that the radio access technology is E-UTRA or NR, and processes and the like at each node or entity will be described in the present embodiment, the present embodiment may be used in other radio access technologies. The name of each node or entity in the present embodiment may be a separate name.

Figure 1:
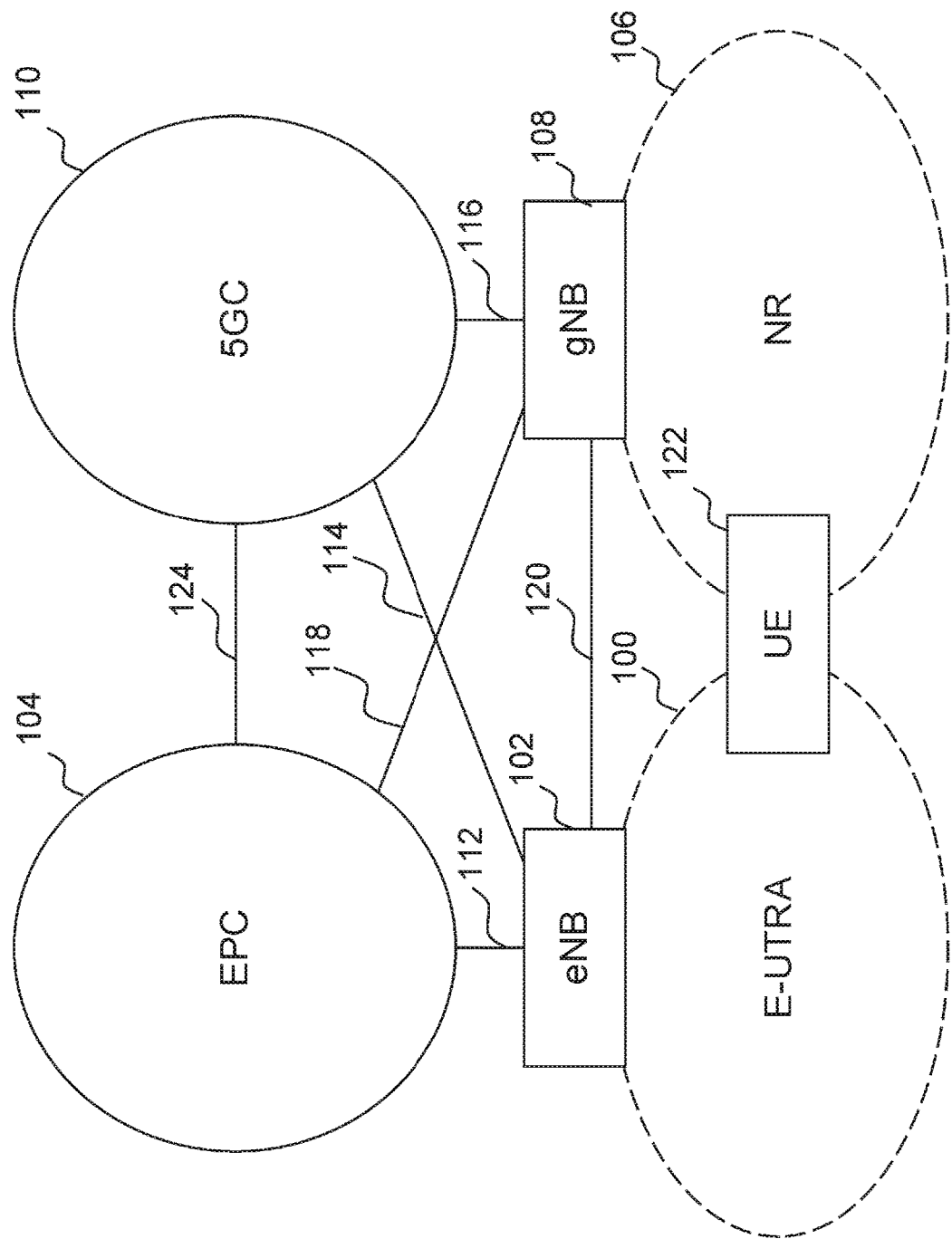
FIG. 1 is a schematic diagram of a communication system according to a present embodiment.

FIG. 1 is a schematic diagram of a communication system according to the present embodiment. Further, a node, a radio access technology, a core network, an interface, and the like each have some functions, described with reference to FIG. 1, that are closely related to the present embodiment, and each may have other functions.

E-UTRA 100 may be a radio access technology. The E-UTRA 100 may be an air interface between UE 122 and an eNB 102. The air interface between the UE 122 and the eNB 102 may be referred to as a Uu interface. The ENB (E-UTRAN Node B) 102 is a base station apparatus of the E-UTRA 100. The eNB 102 may have an E-UTRA protocol described below. An E-UTRA protocol may include an E-UTRA user plane (UP) protocol and an E-UTRA control plane (CP) protocol which will be described below. The eNB 102 may terminate an E-UTRA user plane (UP) protocol and an E-UTRA control plane (CP) protocol for the UE 122. A radio access network including the eNB may be referred to as EUTRAN.

An Evolved Packet Core (EPC) 104 may be a core network. An interface 112 is an interface between the eNB 102 and the EPC 104, and may be referred to as an S1 interface. The interface 112 may include a control plane interface through which control signals pass and/or a user plane interface through which user data passes. The control plane interface of the interface 112 may be terminated by Mobility Management Entity (MME, which is not illustrated) included in the EPC 104. The user plane interface of the interface 112 may be terminated by a serving gateway (S-GW, which is not illustrated) included in the EPC 104. The control plane interface of the interface 112 may be referred to as an S1-MME interface. The user plane interfaces of the interface 112 may be referred to as an S1-U interface.

Further, one or more eNBs 102 may be connected to the EPC 104 via the interface 112. An interface may exist between multiple eNBs 102 connected to the EPC 104 (not illustrated). An interface existing between multiple eNBs 102 connected to the EPC 104 may be referred to as an X2 interface.

NR 106 may be a radio access technology. The NR 106 may be an air interface between the UE 122 and a gNB 108. The air interface between the UE 122 and the gNB 108 may be referred to as a Uu interface. The gNB (g NodeB) 108 is a base station apparatus of the NR 106. The gNB 108 may have an NR protocol described below. The NR protocol may include an NR user plane (UP) protocol and an NR control plane (CP) protocol which will be described below. The gNB 108 may terminate the NR user plane (UP) protocol and the NR control plane (CP) protocol for the UE 122.

A 5GC 110 may be a core network. An interface 116 is an interface between the gNB 108 and the 5GC 110, and may be referred to as an NG interface. The interface 116 may include a control plane interface through which control signals pass and/or a user plane interface through which user data passes. The control plane interface of the interface 116 may be terminated by an Access and mobility Management Function (AMF, which is not illustrated) included in the 5GC 110. The user plane interface of the interface 116 may be terminated by a User Plane Function (UPF, which is not illustrated) included in the 5GC 110. The control plane interface of the interface 116 may be referred to as an NG-C interface. The user plane interfaces of the interface 116 may be referred to as an NG-U interface.

Further, one or more gNBs 108 may be connected to the 5GC 110 via the interface 116. There may be an interface between multiple gNBs 108 connected to the 5GC 110 (not illustrated). The interface between multiple gNBs 108 connected to the 5GC 110 may be referred to as an Xn interface.

The eNB 102 may have a function to connect to the 5GC 110. The eNB 102 having the function to connect to the 5GC 110 may be referred to as an ng-eNB. An interface 114 is an interface between the eNB 102 and the 5GC 110, and may be referred to as an NG interface. The interface 114 may include a control plane interface through which control signals pass and/or a user plane interface through which user data passes. The control plane interface of the interface 114 may be terminated by an AMF included in the 5GC 110. The user plane interface of the interface 114 may be terminated by the UPF included in the 5GC 110. The control plane interface of the interface 114 may be referred to as an NG-C interface. The user plane interfaces of the interface 114 may be referred to as an NG-U interface. A radio access network including the ng-eNB or the gNB may be referred to as an NG-RAN. The NG-RAN, E-UTRAN, or the like may be simply referred to as a network. In addition, the network may include an eNB, an ng-eNB, a gNB, and the like.

Further, one or more eNBs 102 may be connected to the 5GC 110 via the interface 114. There may be an interface between multiple eNBs 102 connected to the 5GC 110 (not illustrated). The interface between multiple eNBs 102 connected to the 5GC 110 may be referred to as an Xn interface. In addition, the eNB 102 connected to the 5GC 110 and the gNB 108 connected to the 5GC 110 may be connected via an interface 120. The interface 120 between the eNB 102 connected to the 5GC 110 and the gNB 108 connected to the 5GC 110 may be referred to as an Xn interface.

The gNB 108 may have a function of connecting to the EPC 104. The gNB 108 having the function of connecting to the EPC 104 may be referred to as an en-gNB. An interface 118 is an interface between the gNB 108 and the EPC 104, and may be referred to as an S1 interface. The interface 118 may include a user plane interface through which user data passes. The user plane interface of the interface 118 may be terminated by an S-GW (not illustrated) included in the EPC 104. The user plane interfaces of the interface 118 may be referred to as an S1-U interface. In addition, the eNB 102 connected to the EPC 104 and the gNB 108 connected to the EPC 104 may be connected via the interface 120. The interface 120 between the eNB 102 connected to the EPC 104 and the gNB 108 connected to the EPC 104 may be referred to as an X2 interface.

An interface 124 is an interface between the EPC 104 and the 5GC 110, and may be an interface which passes a CP alone, or a UP only, or both the CP and UP. In addition, some or all of the interface 114, the interface 116, the interface 118, the interface 120, the interface 124, and the like may not be provided depending on a communication system provided by a network operator.

The UE 122 may be a terminal apparatus capable of receiving system information or a paging message transmitted from the eNB 102 and/or the gNB 108. In addition, the UE 122 may be a terminal apparatus capable of wirelessly connecting to the eNB 102 and/or the gNB 108. In addition, the UE 122 may be a terminal apparatus capable of simultaneously performing a radio connection to the eNB 102 and a radio connection to the gNB 108. The UE 122 may have an E-UTRA protocol, and/or an NR protocol. Further, a radio connection may be a Radio Resource Control (RRC) connection.

In addition, the UE 122 may be a terminal apparatus capable of connecting to the EPC 104 and/or the 5GC 110 via the eNB 102 and/or the gNB 108. In a case that a connection destination core network of the eNB 102, and/or the gNB 108 with which the UE 122 communicates is the EPC 104, each data radio bearer (DRB), which will be described below, established between the UE 122, the eNB 102, and/or the gNB 108 may also be uniquely linked to each evolved packet system (EPS) bearer that passes in the EPC 104. Each EPS bearer may be identified with an EPS bearer identity (or ID). In addition, an identical QoS may be ensured for data such as an IP packet passing through an identical EPS bearer or an Ethernet (trade name) frame.

In addition, in a case that a connection destination core network of the eNB 102 and/or the gNB 108 with which the UE 122 communicates is the 5GC 110, each DRB established between the UE 122, the eNB 102 and/or the gNB 108 may be further linked to one of packet data unit (PDU) sessions established in the 5GC 110. One or multiple QoS flows may be present in each PDU session. Each DRB may be mapped to one or multiple QoS flows or mapped to none of the QoS flows. Each PDU session may be identified with a PDU session identity (or ID). In addition, each QoS flow may be identified with a QoS flow identity. In addition, an identical QoS may be ensured for data such as IP packets or Ethernet frames passing through an identical QoS flow.

There may be no PDU session and/or QoS flow in the EPC 104. In addition, there may be no EPS bearer in the 5GC 110. Although the UE 122 has information of an EPS bearer in a case that the UE 122 is connected to the EPC 104, the UE 122 may not have information of a PDU session and/or a QoS flow. In addition, although the UE 122 has information of a PDU session and/or a QoS flow in a case that the UE 122 is connected to the 5GC 110, the UE 122 may not have information of an EPS bearer.

Further, in the following description, the eNB 102 and/or the gNB 108 will be simply referred to as a base station apparatus, and the UE 122 will be simply referred to as a terminal apparatus or UE.

Figure 2:
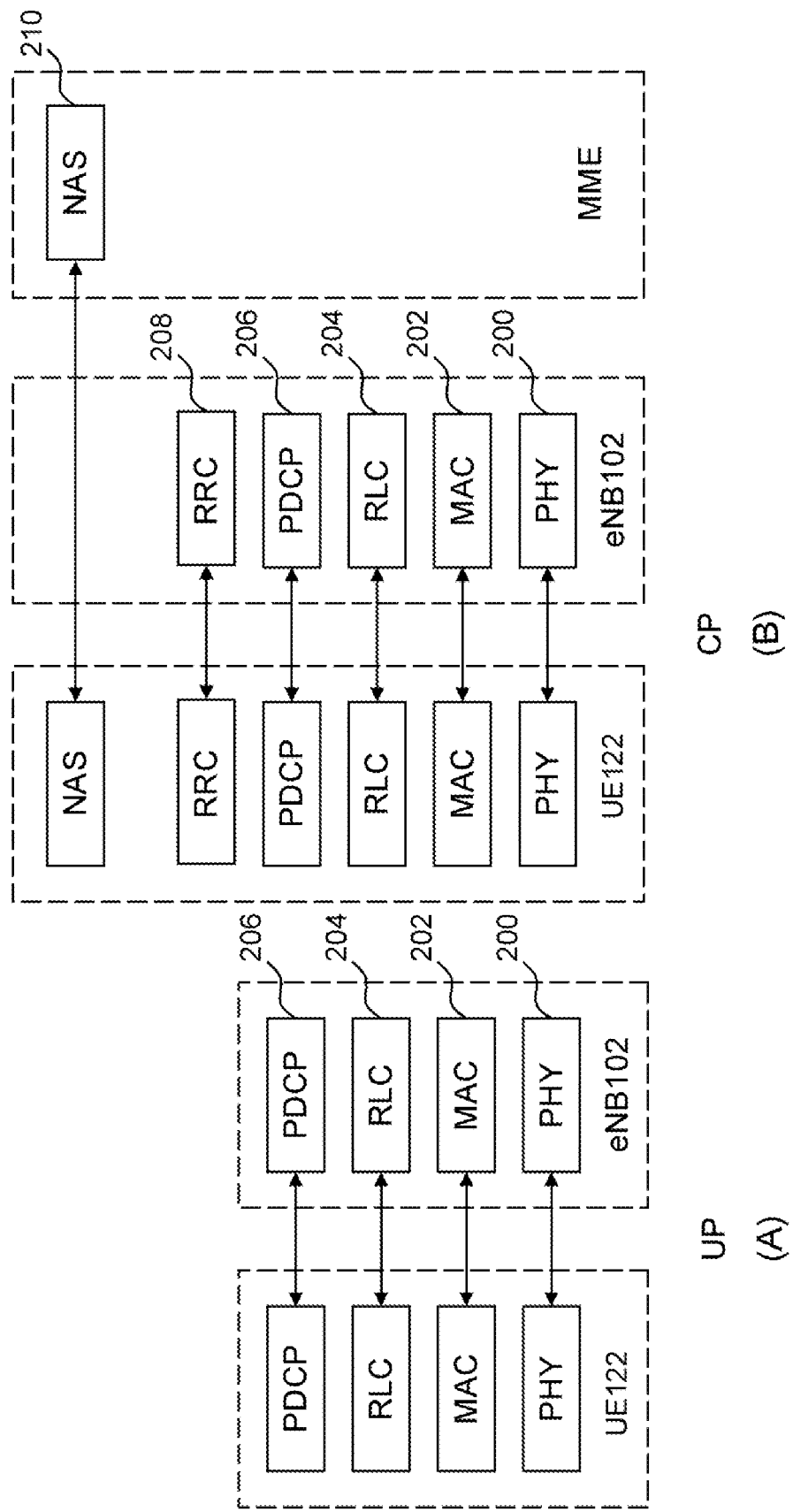
FIG. 2 is a diagram of an exemplary E-UTRA protocol architecture according to the present embodiment.
Figure 3:
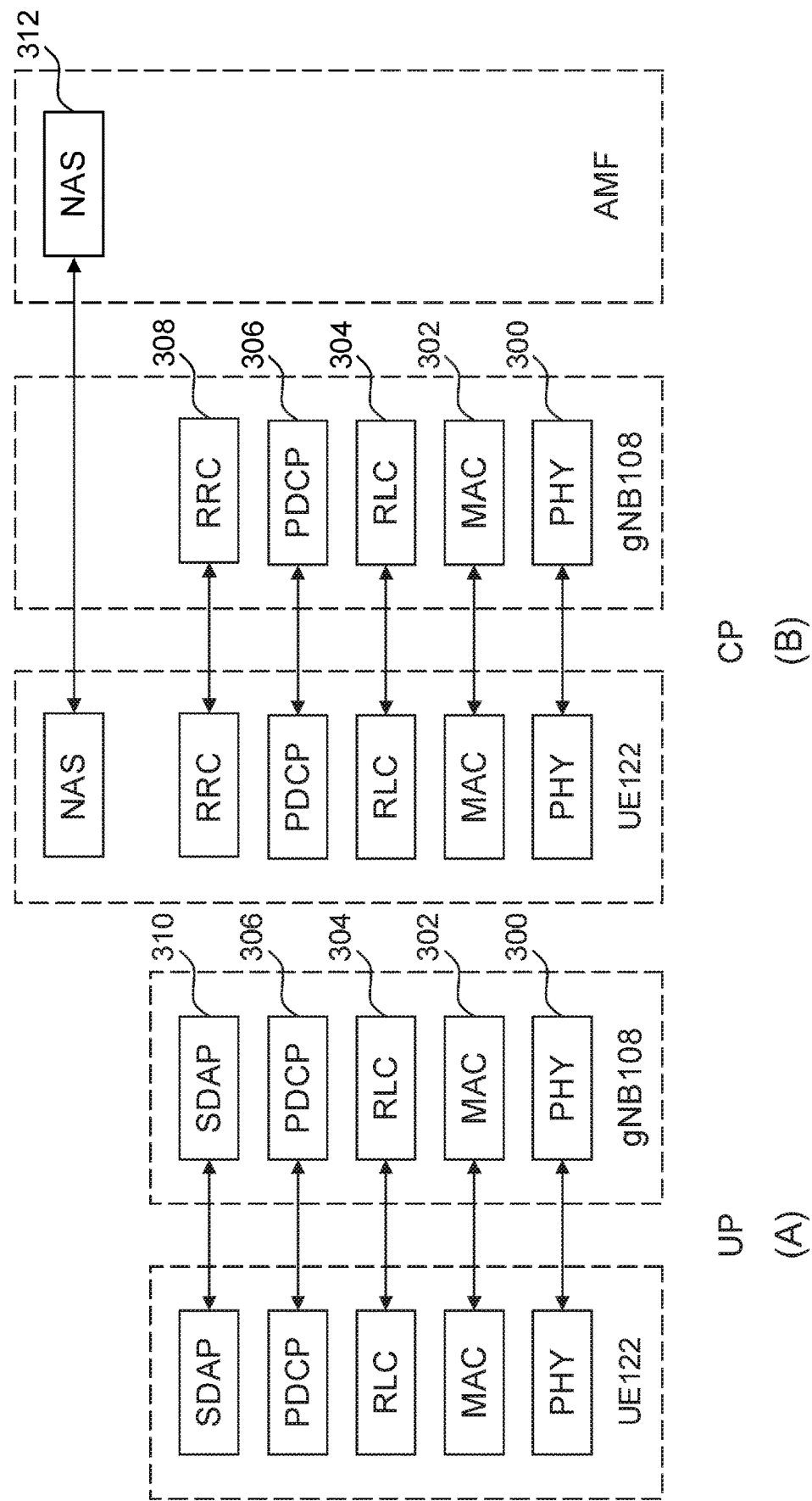
FIG. 3 is a diagram of an exemplary NR protocol architecture according to the present embodiment.

FIG. 2 is a diagram of an exemplary E-UTRA protocol architecture according to the present embodiment. In addition, FIG. 3 is a diagram of an exemplary NR protocol architecture according to the present embodiment. Further, the functions of each protocol described using FIG. 2 and/or FIG. 3 are some functions that are closely related to the present embodiment, and may include other functions. Further, in the present embodiment, uplink (UL) may be a link from a terminal apparatus to a base station apparatus. Also in the present embodiment, downlink (DL) may be a link from a base station apparatus to a terminal apparatus.

FIG. 2A is a diagram of an E-UTRA user plane (UP) protocol stack. As illustrated in FIG. 2A, the E-UTRA UP protocol may be a protocol between the UE 122 and the eNB 102. In other words, the E-UTRA UP protocol may be a protocol terminated by the eNB 102 on the network side. As illustrated in FIG. 2A, the E-UTRA user plane protocol stack may include a physical layer (PHY) 200 that is a radio physical layer, a medium access control (MAC) 202 that is a medium access control layer, a radio link control (RLC) 204 that is a radio link control layer, and a packet data convergence protocol (PDCP) 206 that is a packet data convergence protocol layer.

FIG. 3A is a diagram of an NR user plane (UP) protocol stack. As illustrated in FIG. 3A, the NR UP protocol may be a protocol between the UE 122 and the gNB 108. In other words, the NR UP protocol may be a protocol terminated by the gNB 108 on the network side. As illustrated in FIG. 3A, the NR user plane protocol stack may include a PHY 300 that is a radio physical layer, an MAC 302 that is a medium access control layer, an RLC 304 that is a radio link control layer, a PDCP 306 that is a packet data convergence protocol layer, and a service data adaptation protocol (SDAP) 310 that is a service data adaptation protocol layer.

FIG. 2B is a diagram of an E-UTRA control plane (CP) protocol architecture. In the E-UTRA CP protocol, Radio Resource Control (RRC) 208, which is a radio resource control layer, may be a protocol between the UE 122 and the eNB 102 as illustrated in FIG. 2B. In other words, the RRC 208 may be a protocol terminated by the eNB 102 on the network side. In addition, in the E-UTRA CP protocol, Non Access Stratum (NAS) 210, which is a Non Access Stratum (NAS) layer, may be a protocol between the UE 122 and the MME. In other words, the NAS 210 may be a protocol terminated by the MME on the network side.

FIG. 3B is a diagram of the NR control plane (CP) protocol architecture. In the NR CP protocol, the RRC 308, which is a radio resource control layer, may be a protocol between the UE 122 and the gNB 108 as illustrated in FIG. 3B. In other words, the RRC 308 may be a protocol terminated by the gNB 108 on the network side. In addition, in the NR CP protocol, NAS 312, which is a non access stratum layer, may be a protocol between the UE 122 and the AMF. In other words, the NAS 312 may be a protocol terminated by the AMF on the network side.

Further, an Access Stratum (AS) layer may be a layer terminated between the UE 122 and the eNB 102 and/or the gNB 108. In other words, the AS layer may be a layer including some or all of the PHY 200, the MAC 202, the RLC 204, the PDCP 206, and the RRC 208, and/or a layer including some or all of the PHY 300, the MAC 302, the RLC 304, the PDCP 306, the SDAP 310, and the RRC 308.

Further, in the present embodiment, the terms such as PHY (PHY layer), MAC (MAC layer), RLC (RLC layer), PDCP (PDCP layer), RRC (RRC layer), and NAS (NAS layer) may be used without distinguishing the E-UTRAN protocol from the NR protocol below. In such a case, PHY (PHY layer), MAC (MAC layer), RLC (RLC layer), PDCP (PDCP layer), RRC (RRC layer), and NAS (NAS layer) may respectively be the PHY (PHY layer), MAC (MAC layer), RLC (RLC layer), PDCP (PDCP layer), RRC (RRC layer), and NAS (NAS layer) of the E-UTRAN protocol, or may respectively be PHY (PHY layer), MAC (MAC layer), RLC (RLC layer), PDCP (PDCP layer), RRC (RRC layer), and NAS (NAS layer) of the NR protocol. In addition, SDAP (SDAP layer) may be the SDAP (SDAP layer) of the NR protocol.

In addition, in a case that the E-UTRA protocol is distinguished from the NR protocol below in the present embodiment, the PHY 200, the MAC 202, the RLC 204, the PDCP 206, and the RRC 208 may be referred to as PHY for E-UTRA or PHY for LTE, MAC for E-UTRA or MAC for LTE, RLC for E-UTRA or RLC for LTE, PDCP for E-UTRA or PDCP for LTE, and RRC for E-UTRA or RRC for LTE, respectively. In addition, the PHY 200, the MAC 202, the RLC 204, the PDCP 206, and the RRC 208 may be described as E-UTRA PHY or LTE PHY, E-UTRA MAC or LTE MAC, E-UTRA RLC or LTE RLC, E-UTRA PDCP or LTE PDCP, and E-UTRA RRC or LTE RRC, respectively. Furthermore, in the case that the E-UTRA protocol is distinguished from the NR protocol, the PHY 300, the MAC 302, the RLC 304, the PDCP 306, and the RRC 308 may also be referred to as PHY for NR, MAC for NR, RLC for NR, RLC for NR, and RRC for NR, respectively. Furthermore, PHY 300, the MAC 302, the RLC 304, the PDCP 306, and the RRC 308 may also be described as NR PHY, NR MAC, NR RLC, NR PDCP, and NR RRC, respectively.

An entity of the AS layer of E-UTRA and/or NR will be described. The entity with some or all of the functions of the MAC layer may be referred to as an MAC entity. The entity with some or all of the functions of the RLC layer may be referred to as an RLC entity. The entity with some or all of the functions of the PDCP layer may be referred to as a PDCP entity. The entity with some or all of the functions of the SDAP layer may be referred to as the SDAP entity. The entity with some or all of the functions of the RRC layer may be referred to as an RRC entity. The MAC entity, RLC entity, PDCP entity, SDAP entity, and RRC entity may be referred to as MAC, RLC, PDCP, SDAP, and RRC, respectively.

Further, the data provided from the MAC, RLC, PDCP, and SDAP to a lower layer and/or data provided from a lower layer to the MAC, RLC, PDCP, and SDAP may be referred to as a MAC Protocol Data Unit (PDU), an RLC PDU, a PDCP PDU, and an SDAP PDU, respectively. Further, the data provided from a higher layer to the MAC, RLC, PDCP, and SDAP and/or data provided from the MAC, RLC, PDCP, and SDAP to a higher layer may be referred to as a MAC Service Data Unit (SDU), an RLC SDU, a PDCP SDU, and an SDAP SDU, respectively. In addition, a segmented RLC SDU may be referred to as an RLC SDU segment.

Here, the base station apparatus and the terminal apparatus exchange (transmit and/or receive) signals with (to and/or from) each other in a higher layer. For example, the base station apparatus and the terminal apparatus may transmit and/or receive a Radio Resource Control (RRC) message (also referred to as an RRC message, RRC information, or an RRC signaling) to and/or from each other in an RRC layer. In addition, the base station apparatus and the terminal apparatus may transmit and/or receive a Medium Access Control (MAC) control element to and/or from each other in a MAC layer. In addition, the RRC layer of the terminal apparatus obtains system information broadcast from the base station apparatus. Here, the RRC message, the system information, and/or the MAC control element are also referred to as higher layer signaling or a higher layer parameter. Each of the parameters included in the higher layer signaling received by the terminal apparatus may be referred to as a higher layer parameter. A higher layer in processing by the PHY layer means a higher layer than the PHY layer, and thus may mean one or multiple layers of the MAC layer, the RRC layer, an RLC layer, a PDCP layer, the Non Access Stratum (NAS) layer, and the like. For example, a higher layer in processing by the MAC layer may mean one or multiple layers of the RRC layer, the RLC layer, the PDCP layer, the NAS layer, and the like. Hereinafter, "A is given (provided) in a higher layer" or "A is given (provided) by a higher layer" may mean that a higher layer (mainly the RRC layer, the MAC layer, or the like) of the terminal apparatus receives A from the base station apparatus and the received A is given (provided) from the higher layer of the terminal apparatus to the physical layer of the terminal apparatus. For example, "a higher layer parameter is provided" in a terminal apparatus may mean that higher layer signaling is received from the base station apparatus and the higher layer parameter included in the received higher layer signaling is provided to the physical layer of the terminal apparatus from the higher layer of the terminal apparatus. Configuring a higher layer parameter in the terminal apparatus may mean that the higher layer parameter is given (provided) to the terminal apparatus. For example, configuring a higher layer parameter in the terminal apparatus may mean that the terminal apparatus receives higher layer signaling from the base station apparatus and the received higher layer parameter is configured in the higher layer. However, configuring a higher layer parameter in the terminal apparatus may include configuring a pre-given default parameter in the higher layer of the terminal apparatus. To describe transmission of the RRC message from the terminal apparatus to the base station apparatus, the expression that a message is submitted to a lower layer from the RRC entity of the terminal apparatus may be used. "Submitting a message to a lower layer" from the RRC entity of the terminal apparatus may mean submitting a message to the PDCP layer. "Submitting a message to a lower layer" from the RRC layer of the terminal apparatus may mean submitting a message to the PDCP entity corresponding to each SRB because a message of RRC is transmitted using an SRB (SRB0, SRB1, SRB2, SRB3, etc.). In a case that the RRC entity of the terminal apparatus receives an indication from a lower layer, the lower layer may mean one or more layers of the PHY layer, the MAC layer, the RLC layer, the PDCP layer, and the like.

Exemplary functions of PHY will be described. The PHY of the terminal apparatus may have the function of receiving data transmitted from the PHY of the base station apparatus via a downlink (DL) physical channel. The PHY of the terminal apparatus may have the function of transmitting data to the PHY of the base station apparatus via an uplink (UL) physical channel. The PHY may be connected to upper MAC with a transport channel. The PHY may hand over data to the MAC via a transport channel. In addition, the PHY may also provide data from the MAC via the transport channel. A Radio Network Temporary Identifier (RNTI) may be used in the PHY to identify various types of control information.

Now, physical channels will be described. The following physical channels may be included in physical channels used in radio communication between the terminal apparatus and the base station apparatus.

Physical Broadcast Channel (PBCH)
Physical Downlink Control Channel (PDCCH)
Physical Downlink Shared Channel (PDSCH)
Physical Uplink Control Channel (PUCCH)
Physical Uplink Shared Channel (PUSCH)
Physical Random Access Channel (PRACH)

The PBCH may be used to broadcast system information required by the terminal apparatuses.

In addition, the PBCH may be used to broadcast time indexes (SSB-Indexes) within the periodicity of synchronization signal blocks (SSBs) in NR.

The PDCCH may be used to transmit (or carry) downlink control information (DCI) in downlink radio communication (radio communication from the base station apparatus to the terminal apparatus). Here, one or multiple pieces of DCI (which may be referred to as DCI formats) may be defined for transmission of downlink control information. In other words, a field for downlink control information is defined as DCI and is mapped to information bits. The PDCCH may be transmitted in a PDCCH candidate. The terminal apparatus may monitor a set of PDCCH candidates in the serving cell. Monitoring a set of PDCCH candidates may mean an attempt to decode the PDCCH in accordance with a certain DCI format. In addition, the terminal apparatus may use a Control Resource Set (CORESET) to monitor the set of PDCCH candidates. The DCI format may be used for scheduling of the PUSCH in the serving cell. The PUSCH may be used for transmission of user data, transmission of RRC messages, which will be described below, and the like.

The PUCCH may be used to transmit Uplink Control Information (UCI) in uplink radio communication (radio communication from the terminal apparatus to the base station apparatus). Here, the uplink control information may include Channel State Information (CSI) used to indicate a state of a downlink channel. In addition, the uplink control information may include a Scheduling Request (SR) used to request an Uplink Shared Channel (UL-SCH) resource. In addition, the uplink control information may include a Hybrid Automatic Repeat reQuest ACKnowledgement (HARQ-ACK).

The PDSCH may be used to transmit downlink data (Downlink Shared Channel (DL-SCH)) from the MAC layer. Furthermore, in a case of downlink, the PDSCH may also be used to transmit System Information (SI), a Random Access Response (RAR), and the like.

The PUSCH may be used to transmit uplink data (Uplink Shared Channel (UL-SCH)) from the MAC layer or a HARQ-ACK and/or CSI along with the uplink data. In addition, the PUSCH may be used to transmit CSI only or a HARQ-ACK and CSI only. In other words, the PUSCH may be used to transmit UCI only. In addition, the PDSCH or the PUSCH may be used to transmit RRC signaling (also referred to as an RRC message) and a MAC CE. Here, in the PDSCH, the RRC signaling transmitted from the base station apparatus may be signaling common to multiple terminal apparatuses in a cell. In addition, the RRC signaling transmitted from the base station apparatus may be signaling dedicated to a certain terminal apparatus (also referred to as dedicated signaling). In other words, terminal apparatus-specific (UE-specific) information may be transmitted through signaling dedicated to a certain terminal apparatus. In addition, the PUSCH may be used to transmit a capability of UE (UE capability) in uplink.

The PRACH may be used to transmit a random access preamble. The PRACH may be used to indicate an initial connection establishment procedure, a handover procedure, a connection re-establishment procedure, synchronization (timing adjustment) with respect to uplink transmission, and a request for UL-SCH resources.

Exemplary functions of MAC will be described. The MAC may be referred to as a MAC sub-layer. The MAC may have the function of mapping various logical channels to corresponding transport channels. The logical channels may be identified with logical channel identities (Logical Channel IDs). The MAC may be connected to higher RLC with a logical channel. The logical channels may be divided into control channels that transmit control information and traffic channels that transmit user information depending on the types of information to be transmitted. In addition, the logical channels may be divided into uplink logical channels and downlink logical channels. The MAC may have the function of multiplexing MAC SDUs belonging to one or more different logical channels and providing the multiplexing result to the PHY. The MAC may also have the function of demultiplexing MAC PDUs provided from the PHY and providing demultiplexing result to a higher layer via a logical channel to which each MAC SDU belongs. Further, the MAC may have the function of performing error correction through a Hybrid Automatic Repeat reQuest (HARQ). In addition, the MAC may have a Scheduling Report (SR) function of reporting scheduling information. The MAC may have the function of priority processing among terminal apparatuses using dynamic scheduling. In addition, the MAC may have the function of priority processing among logical channels in one terminal apparatus. The MAC may have the function of priority processing among overlapping resources in one terminal apparatus. The E-UTRA MAC may have the function of identifying Multimedia Broadcast Multicast Services (MBMSs). In addition, the NR MAC may have the function of identifying Multicast/Broadcast Services (MBSs). The MAC may have the function of selecting a transport format. The MAC may have the function of performing Discontinuous Reception (DRX) and/or Discontinuous Transmission (DTX), the function of performing a Random Access (RA) procedure, the Power Headroom Report (PHR) function of notifying information of transmittable power, and the Buffer Status Report (BSR) function of notifying information of the amount of data in the buffer to be transmitted. The NR MAC may have the Bandwidth Adaptation (BA) function. In addition, a MAC PDU format used in the E-UTRA MAC and a MAC PDU format used in the NR MAC may be different. In addition, the MAC PDU may include a MAC control element (MAC CE) that is an element for performing control in the MAC.

Uplink (UL) and/or downlink (DL) logical channels used in E-UTRA and/or NR will be described.

A Broadcast Control Channel (BCCH) may be a downlink logical channel for broadcasting control information of System Information (SI) or the like.

A Paging Control Channel (PCCH) may be a downlink logical channel for carrying a paging message.

A Common Control Channel (CCCH) may be a logical channel for transmitting control information between a terminal apparatus and a base station apparatus. The CCCH may be used in a case that the terminal apparatus does not have an RRC connection. The CCCH may be used between the base station apparatus and multiple terminal apparatuses.

A Dedicated Control Channel (DCCH) may be a logical channel for performing point-to-point bi-directional transmission of dedicated control information between the terminal apparatus and the base station apparatus. The dedicated control information may be control information dedicated to each terminal apparatus. The DCCH may be used in a case that the terminal apparatus has an RRC connection.

A Dedicated Traffic Channel (DTCH) may be a logical channel for performing point-to-point transmission of user data between the terminal apparatus and the base station apparatus. The DTCH may be a logical channel for transmitting dedicated user data. The dedicated user data may be user data dedicated to each terminal apparatus. The DTCH may exist in both uplink and downlink.

Mapping of a logical channel and a transport channel in uplink in the E-UTRA and/or NR will be described.

The CCCH may be mapped to an Uplink Shared Channel (UL-SCH) which is an uplink transport channel.

A DCCH may be mapped to an Uplink Shared Channel (UL-SCH) which is an uplink transport channel.

The DTCH may be mapped to an Uplink Shared Channel (UL-SCH) which is an uplink transport channel.

Mapping of a logical channel and a transport channel in downlink in the E-UTRA and/or NR will be described.

A BCCH may be mapped to a Broadcast Channel (BCH) and/or a Downlink Shared Channel (DL-SCH) that are downlink transport channels.

The PCCH may be mapped to a Paging Channel (PCH), which is a downlink transport channel.

The CCCH may be mapped to a DownLink Shared Channel (DL-SCH) that is a downlink transport channel.

A DCCH may be mapped to a DownLink Shared Channel (DL-SCH) that is a downlink transport channel.

A DTCH may be mapped to a DownLink Shared Channel (DL-SCH) that is a downlink transport channel.

Exemplary functions of the RLC will be described. The RLC may be referred to as an RLC sub-layer. The E-UTRA RLC may have the function of segmenting (segmentation) and/or concatenating (concatenation) data provided from the PDCP of a higher layer and providing the resultant data to a lower layer. The E-UTRA RLC may have the function of performing reassembly and re-ordering on the data provided from the lower layer and providing the resultant data to the higher layer. The NR RLC may have the function of adding a sequence number independent of a sequence number added by the PDCP to data provided from the PDCP of a higher layer. In addition, the NR RLC may have the function of segmenting (segmentation) data provided from the PDCP and providing the resultant data to a lower layer. In addition, the NR RLC may have the function of performing reassembly on the data provided from the lower layer and providing the resultant data to a higher layer. In addition, the RLC may have a data retransmission function and/or a retransmission request function (Automatic Repeat reQuest or ARQ). In addition, the RLC may have the function of performing error correction using an ARQ. Control information indicating data that has been sent from the reception side to the transmission side of the RLC and needs to be retransmitted to make an ARQ may be called a status report. In addition, a status report transmission indication sent from the transmission side to the reception side of the RLC may be called a poll. In addition, the RLC may have the function of detecting duplication of data. In addition, the RLC may have the function of discarding data. The RLC may have three modes including a Transparent Mode (TM), an Unacknowledged Mode (UM), and an Acknowledged Mode (AM). In the TM, data received from a higher layer may not be segmented, and the RLC header may not be added. A TM RLC entity may be configured to be a uni-directional entity, a transmission TM RLC entity, or a receiving TM RLC entity. Although segmentation and/or concatenation of data received from a higher layer, addition of the RLC header, and the like are performed in the UM, data retransmission control may not be performed. The UM RLC entity may be a uni-directional entity or a bi-directional entity. In a case that the UM RLC entity is a uni-directional entity, the UM RLC entity may be configured to be a transmission UM RLC entity or a reception UM RLC entity. In a case that the UM RLC entity is a bi-directional entity, the UM RRC entity may be configured to be a UM RLC entity including a transmitting side and a receiving side. In the AM, segmentation and/or concatenation of data received from a higher layer, the addition of the RLC header, and data retransmission control may be performed. The AM RLC entity may be a bi-directional entity, and may be configured as an AM RLC including a transmitting side and a receiving side. Further, the data provided to the lower layer and/or the data provided from the lower layer in the TM may be referred to as a TMD PDU. In addition, the data provided to the lower layer and/or the data provided from the lower layer in the UM may be referred to as a UMD PDU. In addition, the data provided to the lower layer and/or the data provided from the lower layer in the AM may be referred to as an AMD PDU. An RLC PDU format used in the E-UTRA RLC and an RLC PDU format used in the NR RLC may be different. In addition, the RLC PDU may have an RLC PDU for data and an RLC PDU for control. An RLC PDU for data may be referred to as an RLC Data PDU. In addition, an RLC PDU for control may be referred to as an RLC Control PDU.

Exemplary functions of the PDCP will be described. The PDCP may be referred to as an PDCP sub-layer. The PDCP may have the function of maintaining sequence numbers. In addition, the PDCP may have header compression and decompression functions to efficiently transmit user data such as IP packets or Ethernet frames in radio sections. A protocol used in header compression and decompression of IP packets may be referred to as a Robust Header Combination (ROHC) protocol. In addition, a protocol used in header compression and decompression of Ethernet frames may be referred to as an Ethernet (trade name) Header Compression (EHC) protocol. In addition, the PDCP may have the function of data encryption and decryption. The PDCP may also have the function of data integrity protection and integrity verification. The PDCP may also have the function of re-ordering. The PDCP may also have the PDCP SDU retransmission function. The PDCP may also have the function of discarding data using a discard timer. The PDCP may also have the function of multiplexing (Duplication). The PDCP may also have the function of discarding repeatedly received data. A PDCP entity may be a bi-directional entity, and may include a transmitting PDCP entity and a receiving PDCP entity. In addition, a PDCP PDU format used in the E-UTRA PDCP and a PDCP PDU format used in the NR PDCP may be different. In addition, the PDCP PDU may have an PDCP PDU for data and an PDCP PDU for control. The PDCP PDU for data may be referred to as a PDCP Data PDU. In addition, the PDCP PDU for control may be referred to as a PDCP Control PDU.

Exemplary functions of the SDAP will be described. The SDAP is a service data adaptive protocol layer. The SDAP may have the function of mapping a downlink Qos flow transmitted from the 5GC 110 to the terminal apparatus via the base station apparatus to a data radio bearer (DRB) and/or mapping an uplink QoS flow transmitted from the terminal apparatus to the 5GC 110 via the base station apparatus to a DRB. The SDAP may also have the function of storing mapping rule information. In addition, the SDAP may have the function of marking a QoS Flow ID (QFI). Further, an SDAP PDU may have an SDAP PDU for data and an SDAP PDU for control. The SDAP PDU for data may be referred to as a SDAP Data PDU. In addition, the SDAP PDU for control may be referred to as an SDAP Control PDU. Further, one SDAP entity of the terminal apparatus may be present for a PDU session.

Exemplary functions of the RRC will be described. The RRC may have the broadcasting (broadcast) function. The RRC may have the calling (Paging) function from the EPC 104 and/or the 5GC 110. The RRC may have the calling (Paging) function from the gNB 108 and/or the eNB 102 connected to the 5GC 110. The RRC may also have an RRC connection management function. The RRC may also have a radio bearer control function. The RRC may also have a cell group control function. The RRC may also have a mobility control function. The RRC may also have a terminal apparatus measurement reporting and terminal apparatus measurement reporting control function. The RRC may also have a QoS management function. The RRC may also have the function of detecting and recovering radio link failure. The RRC may use an RRC message to perform broadcasting, paging, RRC connection management, radio bearer control, cell group control, mobility control, terminal apparatus measurement reporting and terminal apparatus measurement reporting control, QoS management, detection and recovery of radio link failure, and the like. Further, an RRC message and a parameter used in the E-UTRA RRC may be different from an RRC message and a parameter used in the NR RRC.

RRC messages may be sent using a BCCH of a logical channel, may be sent using a PCCH of a logical channel, may be sent using a CCCH of a logical channel, and may be sent using a DCCH of a logical channel. Furthermore, an RRC message sent using a DCCH may be paraphrased as dedicated RRC signaling or RRC signaling.

Examples of an RRC message sent using a BCCH may include, for example, Master Information Block (MIB), each type of System Information Block (SIB), and other RRC messages. Examples of an RRC message sent using a PCCH may include, for example, a paging message, or other RRC messages.

An RRC message transmitted in the uplink (UL) direction using a CCCH may include an RRC setup request message (RRC Setup Request), an RRC resumption request message (RRC Resume Request), an RRC reestablishment request message (RRC Reestablishment Request), an RRC system information request message (RRC System Info Request), and the like. In addition, for example, an RRC connection request message (RRC Connection Request), an RRC connection resumption request message (RRC Connection Resume Request), an RRC connection reestablishment request message (RRC Connection Reestablishment Request), and the like may be included. In addition, other RRC messages may be included.

Examples of RRC message sent in the downlink (DL) direction using a CCCH may include, for example, an RRC connection rejection message (RRC Connection Reject), an RRC connection setup message (RRC Connection Setup), an RRC connection reestablishment message (RRC Connection Reestablishment), an RRC connection reestablishment rejection message (RRC Connection Reestablishment Reject), and the like. In addition, for example, an RRC reject message (RRC Reject), an RRC setup message (RRC Setup), and the like may be included. In addition, other RRC messages may be included.

Examples of RRC signaling sent in the uplink (UL) direction using a DCCH may include a measurement report message (Measurement Report), an RRC connection reconfiguration complete message (RRC Connection Reconfiguration Complete), an RRC connection setup complete message (RRC Connection Setup Complete), an RRC connection reestablishment complete message (RRC Connection Reestablishment Complete), a security mode complete message (Security Mode Complete), a UE capability information message (UE Capability Information), and the like. Furthermore, for example, a measurement report message (Measurement Report), an RRC reconfiguration complete message (RRC Reconfiguration Complete), an RRC setup complete message (RRC Setup Complete), an RRC reestablishment complete message (RRC Reestablishment Complete), an RRC resumption complete message (RRC Resume Complete), a security mode complete message (Security Mode Complete), a UE capability information message (UE Capability Information), and the like may be included. In addition, other RRC signaling may be included.

Examples of RRC signaling sent in the downlink (DL) direction using a DCCH may include, for example, an RRC connection reconfiguration message (RRC Connection Reconfiguration), an RRC connection release message (RRC Connection Release), a security mode command message (Security Mode Command), a UE capability enquiry message (UE Capability Enquiry), and the like. Furthermore, for example, an RRC reconfiguration message (RRC Reconfiguration), an RRC resume message (RRC Resume), an RRC release message (RRC Release), an RRC reestablishment message (RRC Reestablishment), a security mode command message (Security Mode Command), a UE capability enquiry message (UE Capability Enquiry), and the like may be included. In addition, other RRC signaling may be included.

Exemplary functions of the NAS will be described. The NAS may have an authentication function. In addition, the NAS may have the function of managing mobility. In addition, the NAS may have a security control function.

The above-described functions of the PHY, the MAC, the RLC, the PDCP, the SDAP, the RRC, and the NAS are examples, and some or all of the functions may not be implemented. In addition, some or all of the functions of each layer may be included in another layer.

Next, a state transition of the UE 122 in LTE and NR will now be described. The UE 122 connected to the EPC or 5GC may be in an RRC_CONNECTED state in a case that an RRC connection has been established. The state in which an RRC connection has been established may include a state in which the UE 122 holds some or all of a UE context described below. In addition, the state in which an RRC connection has been established may include a state in which the UE 122 can transmit and/or receive unicast data.

In addition, the UE 122 may be in an RRC_INACTIVE state in a case that an RRC connection is halted (suspended). Furthermore, the UE 122 being in the RRC_INACTIVE state may be a case in which the UE 122 is being connected to the 5GC and the RRC connection is being suspended. The UE 122 may be in an RRC_IDLE state in a case that the UE 122 is neither in the RRC_CONNECTED state nor the RRC_INACTIVE state.

Further, although the UE 122 does not hold the RRC_INACTIVE state in a case of being connected to the EPC, the E-UTRAN may start suspension of the RRC connection. In a case that the UE 122 is being connected to the EPC and the RRC connection is being suspended, the UE 122 may transition to the RRC_IDLE state while retaining an AS context of the UE and an identity used for resumption (resumeIdentity). A higher layer (e.g., NAS layer) of the RRC layer of the UE 122 may start resumption of the suspended RRC connection in a case that the UE 122 retains the AS context of the UE, the E-UTRAN has permitted the RRC connection to be resumed, and the UE 122 needs to transition from the RRC_IDLE state to the RRC_CONNECTED state.

The definition of suspension may vary between the UE 122 connected to the EPC 104 and the UE 122 connected to the 5GC 110. In addition, all or part of the procedure for the UE 122 from suspension to resumption of the RRC connection may vary between a case in which the UE 122 is connected to the EPC (the UE 122 is suspended in the RRC_IDLE state) and a case in which the UE 122 is connected to the 5GC (the UE 122 is suspended in the RRC_INACTIVE state).

Further, the RRC_CONNECTED state, the RRC_INACTIVE state, and the RRC_IDLE state may be respectively referred to as a connected state (connected mode), a deactivated state (inactive mode), and an idle state (idle mode), and referred to as an RRC connected state (RRC connected mode), an RRC deactivated state (RRC inactive mode), and an RRC idle state (RRC idle mode).

The AS context of the UE retained by the UE 122 may be information including all or some of a current RRC configuration, a current security context, a PDCP state including a RObust Header Compression (ROHC) state, a Cell Radio Network Temporary Identifier (C-RNTI) used in a PCell of a connection source (Source), a cell identity (cellIdentity), and a physical cell identity of the PCell of the connection source. Further, the AS context of the UE retained by any one or all of the eNB 102 and the gNB 108 may include information identical to the AS context of the UE retained by the UE 122, or may include information different from the information included in the AS context of the UE retained by the UE 122.

The security context may be information including all or some of a ciphering key at the AS level, a Next Hop parameter (NH), a Next Hop Chaining Counter parameter (NCC) used to derive an access key for the next hop, an identity of a ciphering algorithm at a selected AS level, and a counter used for replay protection.

Next, a serving cell will be described. For the terminal apparatus in the RRC_CONNECTED state in which CA and/or DC described below are not configured, a serving cell may include one primary cell (PCell). In addition, for the terminal apparatus in the RRC_CONNECTED state in which the CA and/or DC described below are configured, multiple serving cells may mean multiple sets of cells including one or more special cells (SpCells), and one or more all secondary cells (SCells). An SpCell may support PUCCH transmission and contention-based random access (CBRA). A PCell may be a cell used in an RRC connection establishment procedure in a case that the terminal apparatus in the RRC idle state transitions to an RRC connected state. In addition, a PCell may be a cell used in an RRC connection reestablishment procedure in which the terminal apparatus reestablishes an RRC connection. In addition, a PCell may be a cell used in a random access procedure in a case of a handover. A PSCell may be a cell used in a random access procedure in a case of addition of a secondary node which will be described below. A PCell and a PSCell may be SpCells. In addition, a SpCell may be a cell used for applications other than the applications described above.

A group of serving cells configured for the terminal apparatus and including an SpCell and one or more SCells may be considered to be carrier aggregation (CA) being configured for the terminal apparatus. Furthermore, a cell that provides additional radio resources for an SpCell to the terminal apparatus configured with CA may mean an SCell.

Among groups of serving cells configured using RRC, a group of serving cells using the same timing reference cells as a cell for which uplink is configured and the same value of timing advance may be referred to as a timing advance group (TAG). In addition, a TAG including an SpCell of an MAC entity may mean a Primary Timing Advance Group (PTAG). In addition, TAGs other than the above-described PTAG may mean a Secondary Timing Advance Group (STAG). Further, one or more of the TAGs may be configured for each cell group described below.

A cell group configured from the base station apparatus for the terminal apparatus will be described. A cell group may include one SpCell. In addition, a cell group may include one SpCell and one or more SCells. In other words, a cell group may include one SpCell, and one or more SCells depending on necessity (optionally). Further, a cell group may be expressed as a set of cells.

Dual Connectivity (DC) may be a technique of performing data communication by utilizing radio resources of a cell group including a first base station apparatus (a first node) and a cell group including a second base station apparatus (a second node). In a case that DC or MR-DC described below is performed, a cell group may be added for the terminal apparatus by a base station apparatus. To perform DC, the first base station apparatus may add the second base station apparatus. The first base station apparatus may be referred to as a master node (MN). Also, a cell group including a master node may be referred to as a master cell group (MCG). The second base station apparatus may be referred to as a secondary node (SN). In addition, a cell group including a secondary node may be referred to as a secondary cell group (SCG). Further, the master node and the secondary node may be included in the same base station apparatus.

In addition, in a case that DC is not configured, a cell group configured for the terminal apparatus may be referred to as an MCG. In addition, in a case that DC is not configured, a SpCell configured for the terminal apparatus may be a PCell.

Further, Multi-Radio Dual Connectivity (MR-DC) may be a technique of performing DC using E-UTRA in an MCG and using NR in an SCG. In addition, MR-DC may be a technique of performing DC using NR in an MCG and using E-UTRA in an SCG. Furthermore, MR-DC may be a technique of performing DC using NR in both an MCG and an SCG. MR-DC may be a technique included in DC. Examples of MR-DC in which E-UTRA is used in an MCG and NR is used in an SCG may include E-UTRA-NR Dual Connectivity (EN-DC) using EPC for a core network, and NG-RAN E-UTRA-NR Dual Connectivity (NGEN-DC) using a 5GC for a core network. Furthermore, examples of MR-DC in which NR is used in an MCG and E-UTRA is used in an SCG may include NR-E-UTRA Dual Connectivity (NE-DC) using a 5GC for a core network. In addition, examples of MR-DC in which NR is used in both an MCG and an SCG may include NR-NR Dual Connectivity (NR-DC) using a 5GC for a core network.

Further, in the terminal apparatus, there may be one MAC entity in each cell group. For example, in a case that DC or MR-DC is configured for the terminal apparatus, one MAC entity for an MCG and one MAC entity for an SCG may exist. The MAC entity for an MCG in the terminal apparatus may always be established for the terminal apparatus in any state (the RRC idle state, the RRC connected state, the RRC deactivated state, or the like). In addition, the MAC entity for an SCG in the terminal apparatus may be created by the terminal apparatus in a case that the SCG is configured for the terminal apparatus. In addition, the MAC entity for each cell group of the terminal apparatus may be configured by the terminal apparatus receiving RRC signaling from the base station apparatus. In a case that the MAC entity is associated with an MCG, an SpCell may mean a PCell. In addition, in a case that the MAC entity is associated with an SCG, an SpCell may mean a primary SCG cell (PSCell). In addition, in a case that the MAC entity is not associated with a cell group, an SpCell may mean a PCell. The PCell, PSCell, and SCell are serving cells. In EN-DC and NGEN-DC, the MAC entity for an MCG may be an E-UTRA MAC entity, and the MAC entity for an SCG may be an NR MAC entity. Furthermore, in NE-DC, the MAC entity for an MCG may be an NR MAC entity, and the MAC entity for an SCG may be an E-UTRA MAC entity. In addition, in NR-DC, the MAC entities for an MCG and an SCG may both be NR MAC entities. Further, one MAC entity being present for each cell group may be paraphrased as one MAC entity being present for each SpCell. Furthermore, one MAC entity for each cell group may be paraphrased as one MAC entity for each SpCell.

A radio bearer will be described. In a case that the terminal apparatus communicates with the base station apparatus, a radio bearer (RB) may be established between the terminal apparatus and the base station apparatus to perform a radio connection. A radio bearer used in CP may be referred to as a signaling radio bearer (SRB). In addition, a radio bearer used in UP may be referred to as a data radio bearer (DRB). A radio bearer identity (ID) may be assigned to each radio bearer. A radio bearer identity for an SRB may be referred to as an SRB identity (SRB ID). A radio bearer identity for a DRB may be referred to as a DRB identity (DRB ID). SRB0 to SRB2 may be defined for SRB of E-UTRA, and other SRBs may be defined. SRB0 to SRB3 may be defined for SRB of NR, and other SRBs may be defined. The SRB0 may be an SRB for an RRC message, which is transmitted and/or received using the logical channel CCCH. The SRB1 may be an SRB for RRC signaling and for NAS signaling prior to the establishment of the SRB2. The RRC signaling to be transmitted and/or received using the SRB1 may include piggybacked NAS signaling. The logical channel DCCH may be used for all RRC signaling and NAS signaling transmitted and/or received using the SRB1. The SRB2 may be an SRB for a NAS signaling and RRC signaling including logged measurement information. The logical channel DCCH may be used for all RRC signaling and NAS signaling transmitted and/or received using the SRB2. In addition, the SRB2 may have a lower priority than SRB1. The SRB3 may be an SRB for transmitting and/or receiving specific RRC signaling in a case that the terminal apparatus is configured with EN-DC, NGEN-DC, NR-DC, and the like. The logical channel DCCH may be used for all RRC signaling and NAS signaling transmitted and/or received using the SRB3. Other SRBs may also be provided for other applications. A DRB may be a radio bearer for user data. The logical channel DTCH may be used for RRC signaling transmitted and/or received using a DRB.

A radio bearer of the terminal apparatus will be described. A radio bearer may include an RLC bearer. The RLC bearer may include one or two RLC entities and a logical channel. In a case that there are two RLC entities in the RLC bearer, the RLC entities may be a transmission RLC entity and a reception RLC entity in a TM RLC entity and/or a unidirectional UM-mode RLC entity. The SRB0 may include one RLC bearer. The RLC bearer of the SRB0 may be include a TM RLC entity and a logical channel. The SRB0 may always be established in a terminal apparatus in any state (the RRC idle state, the RRC connected state, the RRC deactivated state, or the like). One SRB1 may be established and/or configured in the terminal apparatus by RRC signaling received from the base station apparatus in a case that the terminal apparatus transitions from the RRC idle state to the RRC connected state. The SRB1 may include one PDCP entity and one or more RLC bearers. The RLC bearers of the SRB1 may include an AM RLC entity and a logical channel. One SRB2 may be established and/or configured in the terminal apparatus by the RRC signaling received from the base station apparatus by the terminal apparatus in the RRC connected state in which AS security is activated. The SRB2 may include one PDCP entity and one or more RLC bearers. The RLC bearers of the SRB2 may include an AM RLC entity and a logical channel. Further, the PDCP of the SRB1 and SRB2 on the base station apparatus side may be allocated on a master node. In a case that a secondary node is added in EN-DC, NGEN-DC, or NR-DC, or in a case that a secondary node is changed, one SRB3 may be established and/or configured in the terminal apparatus by the RRC signaling received from the base station apparatus by the terminal apparatus in the RRC connected state in which AS security is activated. The SRB3 may be a direct SRB between the terminal apparatus and the secondary node. The SRB3 may include one PDCP entity and one or more RLC bearers. The RLC bearers of the SRB3 may include an AM RLC entity and a logical channel. The PDCP of the SRB3 on the base station apparatus side may be allocated on the secondary node. One or more DRBs may be established and/or configured in the terminal apparatus by the RRC signaling received from the base station apparatus by the terminal apparatus in the RRC connected state in which AS security is activated. The DRBs may include one PDCP entity and one or more RLC bearers. The RLC bearers of the DRBs may include a UM RLC entity and a logical channel.

Further, in MR-DC, a radio bearer in which the PDCP is allocated on the master node may be referred to as an MN terminated bearer. In addition, in MR-DC, a radio bearer in which the PDCP is allocated on the secondary node may be referred to as an SN terminated bearer. Further, in MR-DC, a radio bearer in which an RLC bearer is present only in an MCG may be referred to as an MCG bearer. Further, in MR-DC, a radio bearer in which an RLC bearer is present only in an SCG may be referred to as an SCG bearer. In addition, in DC, a radio bearer in which RLC bearers are present in both an MCG and an SCG may be referred to as a split bearer.

In a case that MR-DC is configured for the terminal apparatus, the bearer types of the SRB1 and the SRB2 established and/or configured in the terminal apparatus may be the MN-terminated MCG bearer and/or MN-terminated split bearer. In addition, in a case that MR-DC is configured for the terminal apparatus, the bearer type of SRB3 that is established and/or configured in the terminal apparatus may be an SN-terminated SCG bearer. In addition, in a case that MR-DC is configured for the terminal apparatus, the bearer type of the DRB that is established and/or configured in the terminal apparatus may be any of all bearer types.

An RLC entity established and/or configured for an RLC bearer established and/or configured in a cell group configured with E-UTRA may be an E-UTRA RLC. In addition, an RLC entity established and/or configured for an RLC bearer established and/or configured in a cell group configured with NR may be an NR RLC. In a case that EN-DC is configured for the terminal apparatus, a PDCP entity established and/or configured in an MN-terminated MCG bearer may be either E-UTRA PDCP or NR PDCP. In addition, in a case that EN-DC is configured for the terminal apparatus, a PDCP established and/or configured for a radio bearer of other bearer types, namely an MN-terminated split bearer, an MN-terminated SCG bearer, an SN-terminated MCG bearer, an SN-terminated split bearer, and an SN-terminated SCG bearer may be NR PDCP. In addition, in a case that NGEN-DC, NE-DC, or NR-DC is configured for the terminal apparatus, a PDCP entity established and/or configured for radio bearers of all bear types may be the NR PDCP.

Further, in NR, a DRB established and/or configured for the terminal apparatus may be linked to one PDU session. One SDAP entity may be established and/or configured for one PDU session for the terminal apparatus. The establishment and/or configuration SDAP entity, PDCP entity, RLC entity, and logical channel for the terminal apparatus may be established and/or configured by RRC signaling received by the terminal apparatus from the base station apparatus.

Further, a network configuration in which the eNB 102 is used as a master node and the EPC 104 is used as a core network regardless of whether MR-DC is configured may be referred to as E-UTRA/EPC. Additionally, a network configuration in which the eNB 102 is used as a master node and the 5GC 110 is used as a core network may be referred to as E-UTRA/5GC. In addition, a network configuration in which the gNB 108 is used as a master node and the 5GC 110 is used as a core network may be referred to as NR or NR/5GC. In a case that MR-DC is not configured, the above-described master node may refer to a base station apparatus that communicates with the terminal apparatus.

Next, a handover in LTE and NR will now be described. A handover may be a process of the UE 122 in the RRC connected state to change the serving cell from a source SpCell to a target SpCell. A handover may be performed in a case that the UE 122 receives RRC signaling indicating a handover from the eNB 102 and/or the gNB 108. The RRC signaling indicating the handover may be a message related to a reconfiguration of an RRC connection including a parameter indicating a handover (e.g., an information element named MobilityControlInfo, or an information element named Reconfiguration WithSync). Further, the information element named Mobility ControlInfo described above may be paraphrased as mobility control configuration information element, mobility control configuration, or mobility control information. Further, the information element named Reconfiguration WithSync described above may be paraphrased as synchronized reconfiguration information element, or synchronized reconfiguration. In addition, the RRC signaling indicating the handover may be a message indicating movement of other RAT to a cell (e.g., Mobility FromEUTRACommand, or Mobility FromNRCommand). In addition, the handover may also be paraphrased as reconfiguration with synchronization (reconfiguration with sync). In addition, conditions that allow the UE 122 to perform a handover may include some or all of a case in which AS security is activated, a case in which the SRB2 is established, and a case in which at least one DRB is established.

Figure 4:
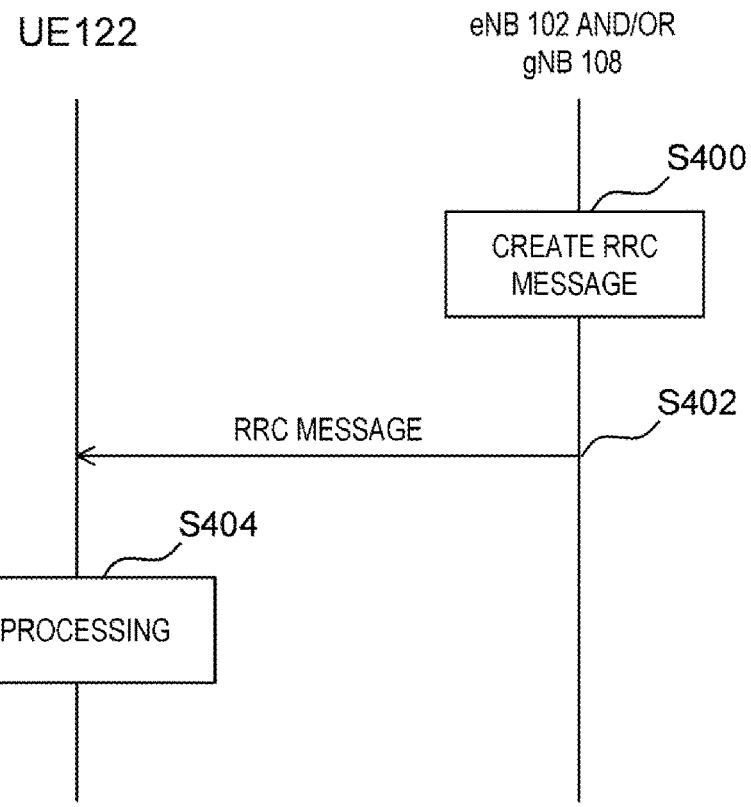
FIG. 4 is a diagram illustrating an exemplary flow of a procedure for various configurations in RRC according to the present embodiment.

The flow of RRC signaling transmitted and/or received to and/or from the terminal apparatus and the base station apparatus will be described. FIG. 4 is a diagram illustrating an exemplary flow of a procedure for various configurations in RRC according to the present embodiment. FIG. 4 is an exemplary flow of a case in which RRC signaling is sent from the base station apparatus (eNB 102 and/or gNB 108) to the terminal apparatus (UE 122).

In FIG. 4, the base station apparatus creates an RRC message (step S400). Creation of an RRC message by the base station apparatus may be performed to deliver system information (SI) or a paging message by the base station apparatus. Furthermore, the creation of an RRC message by the base station apparatus may be performed to transmit RRC signaling by base station apparatus to cause a specific terminal apparatus to perform a process. Examples of the process to be performed by a specific terminal apparatus may include a process of security-related configuration, reconfiguration of RRC connection, a handover to a different RAT, suspension of RRC connection, and release of RRC connection. Examples of the process of reconfiguration of RRC connection may include a process of control of radio bearers (establishment, change, release, and the like), control of cell groups (establishment, addition, change, release, and the like), measurement configuration, handover, and security key updates. Furthermore, the creation of an RRC message by the base station apparatus may be performed in order to respond to RRC signaling transmitted from the terminal apparatus. Examples of the response to the RRC signaling transmitted from the terminal apparatus may include a response to an RRC setup request, a response to an RRC reconnection request, and a response to an RRC resume request. The RRC message includes information (parameters) for various information notifications and configurations. These parameters may be referred to as fields and/or information elements, and may be described using a description method called Abstract Syntax Notation One (ASN.1).

In FIG. 4, the base station apparatus then transmits the created RRC signaling to the terminal apparatus (step S402). Then, in a case that a process such as configuration is necessary in accordance with the received RRC signaling, the terminal apparatus performs the process (step S404). The terminal apparatus that has performed process may transmit to the base station apparatus RRC signaling as a response (not illustrated).

RRC signaling may be used not only in the above examples but also for other purposes.

Further, in MR-DC, RRC of the master node side may be used in order to transfer RRC signaling to and/or from the terminal apparatus, the RRC signaling being used for configuration (cell group configuration, radio bearer configuration, measurement configuration, and the like) on an SCG side. For example, in EN-DC or NGEN-DC, RRC signaling of NR may be included, in the form of a container, in an information element (nr-SecondaryCellGroupConfig) for the configuration on the SCG side of RRC signaling of E-UTRA transmitted and/or received to and/or from each other between the eNB 102 and the UE 122. Furthermore, in NE-DC, RRC signaling of E-UTRA may be included, in the form of a container, in an information element (MRDC-Secondary CellGroupConfig) for configuration of the SCG side of RRC signaling of NR transmitted and/or received to and/or from each other between the gNB 108 and the UE 122. The RRC signaling for configuration on the SCG side may be transmitted and/or received to and/or from each other between the master node and the secondary node. Furthermore, in NR-DC, RRC signaling of NR may be included, in the form of a container, in an information element (MRDC-SecondaryCellGroupConfig) for configuration of the SCG side of RRC signaling of NR transmitted and/or received to and/or from each other between the gNB 108 and the UE 122. The RRC signaling for configuration on the SCG side may be transmitted and/or received to and/or from each other between the master node and the secondary node.

Further, the embodiment is not limited to the case of utilization of MR-DC, and RRC signaling for E-UTRA transmitted from the eNB 102 to the UE 122 may include RRC signaling for NR, and RRC signaling for NR transmitted from the gNB 108 to the UE 122 may include RRC signaling for E-UTRA.

Exemplary parameters included in a message related to reconfiguration of an RRC connection will be described. FIG. 7 illustrates an exemplary description of ASN.1 included in a message regarding reconfiguration of an RRC connection in NR in FIG. 4, the description indicating a field for cell group configuration and/or information elements. In addition, FIG. 8 illustrates an exemplary description of ASN.1 included in a message of reconfiguration of an RRC connection in E-UTRA in FIG. 4, the description indicating a field for cell group configuration and/or information elements. The embodiment is not limited to FIG. 7 and FIG. 8, and in the example of ASN.1 in the present embodiment, <omitted> and <partly omitted> are not a part of the notation of ASN.1 and indicate that other information is omitted. Further, there may also be omitted information elements in a part where neither <omitted> nor <partly omitted> is indicated. Further, in the present embodiment, the example of ASN.1 does not follow the ASN.1 notation method correctly. The example of ASN.1 in the present embodiment represents the notation of an example of parameters of RRC signaling of the present embodiment, and other names and notation may be used. In addition, the example of ASN.1 represents only examples related to main information closely associated with the present embodiment in order to avoid complicated description. Further, the parameters notated in ASN.1 may all be referred to as information elements without distinction between fields, information elements, or the like. In addition, in the present embodiment, fields, information elements, or the like included the RRC signaling and described in ASN.1 may be paraphrased as information or parameters. Further, a message related to reconfiguration of an RRC connection may be an RRC reconfiguration message in NR or an RRC connection reconfiguration message in E-UTRA.

The information element named CellGroupConfig in FIG. 7 may be an information element used in configuration, change, release, and the like of cell groups of an MCG or an SCG in NR. The information element named CellGroupConfig may include a TCI information element to be described below. The information element named CellGroupConfig may be paraphrased as a cell group configuration information element or cell group configuration. Further, in a case that the information element named CellGroupConfig is used for configuration of a cell group of an SCG in NR, the information element named CellGroupConfig may be paraphrased as configuration on the SCG side. The information element named SpCellConfig included in the information element named CellGroupConfig may be an information element used to configure a special cell (SpCell). The information element named SpCellConfig may be paraphrased as an SpCell configuration information element or SpCell configuration. The information element named DeactivatedSCG-Config-r17 included in the information element named SpCellConfig may be the information element configured in the deactivation of an SCG to be described below. The information element named DeactivatedSCG-Config-r17 may be paraphrased as configuration in deactivation of an SCG.

Activation and deactivation of cells will be described. The base station apparatus notifies the terminal apparatus communicating in Dual Connectivity of configuration of a master cell group (MCG) and a secondary cell group (SCG) using the message of the reconfiguration of the RRC connection described above. Each cell group may include an SpCell and zero or more SCells. An SpCell of the MCG is also referred to as a PCell. An SpCell of the SCG is also referred to as a PSCell.

Cell deactivation may not be applied to a PCell, and may be applied to a PSCell. In this case, the cell deactivation process of an SpCell may be different from that of an SCell.

Cell activation and deactivation may be processed at an MAC entity present for each cell group. The SCell configured for the terminal apparatus may be activated and/or deactivated by some or all of the following factors (A) to (C).
- (A) Reception of MAC CE to activate/deactivate an SCell
- (B) Expiration of an SCell deactivation timer configured for each SCell (the SCell may be limited to an SCell with no PUCCH configured)
- (C) RRC parameter configured for each SCell configured for a terminal apparatus (sCellState)

Specifically, the MAC entity of the terminal apparatus may perform some or all of (1) to (3) of the following process (AD) for each SCell configured in a cell group.

Process (AD)
- (1) In a case that an RRC parameter (sCellState) configured in an SCell is configured to be activated or an MAC CE that activates the SCell is received, the MAC entity of the terminal apparatus performs some or all of the process (AD-1) from (1) to (3). Otherwise, in a case that an MAC CE that deactivates an SCell is received or an SCell deactivation timer expires in an SCell in an activated state, the MAC entity of the terminal apparatus performs the process (AD-2).
- (2) In a case that a PDCCH of an SCell in an activated state gives a notification of an uplink grant or downlink allocation, in a case that a PDCCH of a certain serving cell gives a notification of an uplink grant or downlink allocation to the SCell in an activated state, in a case that a MAC PDU is transmitted according to a configured uplink grant, or in a case that an MAC PDU is received in the configured downlink allocation, the MAC entity of the UE 122 restarts the SCell deactivation timer associated with the SCell.
- (3) In a case that the SCell becomes in a deactivated state, the MAC entity of the terminal apparatus performs the process (AD-3).

Process (AD-1)
- (1) In a case that, in NR, the SCell is in a deactivated state before the MAC CE that activates the SCell is received or the RRC parameter (sCellState) configured in the SCell is configured to be activated in configuring of the SCell, the MAC entity of the terminal apparatus performs some or all of the process (AD-1-1) from (1) to (3).
- (2) The MAC entity of the terminal apparatus starts the SCell deactivation timer associated with the SCell, or restarts the timer (in a case that the SCell deactivation timer has already started).
- (3) In a case that an active DL BWP is not a dormant BWP (Dormant BWP) and there is a suspended type 1 configured uplink grant associated with the SCell according to a stored configuration, the MAC entity of the terminal apparatus (re) initializes the uplink grant. Then, the MAC entity of the terminal apparatus triggers a PHR.

Process (AD-1-1)
- (1) In a case that a BWP indicated a first active downlink BWP identity (firstActiveDownlinkBWP-Id), which is configured in the RRC message for the SCell, is not configured to be a dormant BWP, the MAC entity of the terminal apparatus performs the process (AD-1-1-1).
- (2) In a case that a BWP indicated by a first active downlink BWP identity (firstActiveDownlinkBWP-Id), which is configured in the RRC message for the SCell, is configured to be a dormant BWP, the MAC entity of the terminal apparatus stops a BWP deactivation timer (bwp-Inactivity Timer) of the serving cell in a case that the BWP deactivation timer is running.
- (3) The MAC entity of the terminal apparatus activates a downlink BWP indicated by the first active downlink BWP identity (firstActiveDownlinkBWP-Id) and an uplink BWP indicated by a first active uplink BWP identity (firstActiveUplinkBWP-Id), which is configured in the RRC message for the SCell.

Process (AD-1-1-1)
The MAC entity of the terminal apparatus causes the SCell to be in an activated state at a predetermined timing, and applies a normal SCell operation including some or all of the followings (A) to (E).
- (A) Transmit a sounding reference signal (SRS) in the SCell.
- (B) Report CSI for the SCell.
- (C) Monitor the PDCCH of the SCell.
- (D) Monitor the PDCCH for the SCell. (In a case that scheduling is performed for the SCell in other serving cells)
- (E) Transmit the PUCCH in the SCell in a case that a PUCCH is configured.

Process (AD-2)
The MAC entity of the terminal apparatus performs some or all of the followings (A) to (F).
- (A) Deactivate the SCell.
- (B) Stop the SCell deactivation timer associated with the SCell.
- (C) Deactivate all Active BWPs associated with the SCell.
- (D) Clear all configured downlink allocations and/or all configured uplink grants of grant type 2 associated with the SCell.
- (E) Suspend all configured uplink grant grants of grant type 1 associated with the SCell.
- (F) Flash the buffer of HARQ associated with the SCell.

Process (AD-3)
The MAC entity of the terminal apparatus performs some or all of the followings (A) to (D).
- (A) Transmit no SRS in this SCell.
- (B) Report CSI for this SCell.

(C) Transmit neither PUCCH nor UL-SCH and/or transmit no RACH in this SCell.

(D) Monitor no PDCCH for the SCell, and/or monitor no PDCCH for the SCell.

As described above, the MAC entity performs the process (AD), thereby activating and deactivating the SCell.

In addition, in a case that an SCell is added as described above, an initial state of the SCell may be configured by RRC signaling.

Here, the SCell deactivation timer will be described. The SCell without PUCCH configuration may be notified of a value of the SCell deactivation timer (information related to the time at which the timer is considered to be expired) through the RRC signaling. For example, in a case that notification of information indicating a SCell deactivation timer of 40 ms is received through the RRC signaling, the timer is considered to be expired at a time when a timer does not stop and a time in the notification (40 ms in this case) elapses after the timer is started or re-started. In addition, the SCell deactivation timer may be a timer named sCellDeactivation Timer.

Here, a bandwidth part (BWP) will be described.

The BWP may be a part or entirety of a band of a serving cell. In addition, the BWP may be referred to as a carrier BWP. One or more BWPs may be configured for the terminal apparatus. A certain BWP may be configured according to information included in system information associated with a synchronization signal detected in an initial cell search. In addition, a certain BWP may be a frequency bandwidth associated with a frequency at which the initial cell search is performed. In addition, a certain BWP may be configured through RRC signaling (e.g., dedicated RRC signaling). Furthermore, a downlink BWP (DL BWP) and an uplink BWP may be individually configured. In addition, one or more uplink BWPs may be associated with one or more downlink BWPs. Furthermore, the association of the uplink BWP with the downlink BWP may be predetermined, may be made through RRC signaling (e.g., Dedicated RRC signaling), may be made through physical layer signaling (e.g., downlink control information (DCI) notified on a downlink control channel), or may be made through a combination thereof. In addition, CORESET may be configured for a downlink BWP.

A BWP may include a group of continuous physical resource blocks (PRBs). In addition, BWP parameters (one or more BWPs) per component carrier may be configured for the terminal apparatus in the connected state. The BWP parameters per component carrier may include some or all of (A) the type of cyclic prefix; (B) subcarrier spacing; (C) a frequency position of a BWP (e.g., the starting position or center frequency position of a BWP on a low frequency side) (For example, the frequency position may use ARFCN, or an offset from a specific subcarrier of a serving cell. Furthermore, the unit of the offset may be a subcarrier unit or a resource block unit. In addition, both ARFCN and offset may be configured); (D) a BWP bandwidth (e.g., number of PRBs); (E) resource configuration information of a control signal; and (F) a central frequency position of SS blocks (For example, ARFCN may be used, or an offset from a specific subcarrier of a serving cell may be used. Furthermore, the unit for the offset may be a unit on a per subcarrier basis or may be a unit on a per resource block basis. In addition, both ARFCN and an offset may be configured). Furthermore, the resource configuration information of the control signal may be included in configuration of a BWP of at least some or all of a PCell and/or a PSCell.

The terminal apparatus may be transmitted and/or received in an Active BWP among one or more configured BWPs. One or more BWPs may be configured in one serving cell related to the terminal apparatus. Among one or more BWPs that are configured for one serving cell related to the terminal apparatus, it may be configured such that one uplink BWP at most and/or one downlink BWP at most are Active BWPs at a certain time. A downlink Active BWP is also referred to as an Active DL BWP. An uplink Active BWP is also referred to as an Active UL BWP. In addition, among one or more BWPs that are configured for the terminal apparatus, a BWP that is not an Active BWP may be referred to as an Inactive BWP.

Next, activation/deactivation of a BWP will be described. Activation of a BWP may mean activating a BWP or activating an Inactive BWP. In addition, deactivation of a BWP may mean deactivating a BWP or deactivating an Active BWP. BWP switching in a serving cell is used to activate an Inactive BWP to deactivate an Active BWP.

BWP switching is controlled by a PDCCH indicating downlink allocation or uplink grant, a BWP deactivation timer, RRC signaling, or the MAC entity itself for the initiation of a random access procedure. The Active BWP of the serving cell is indicated using RRC or PDCCH.

Next, the BWP deactivation timer (bwp-Inactivity Timer) will be described. For each of activated serving cells for which the BWP deactivation timer has been configured, the MAC entity performs some or all of (1) to (2) of the following processes (DB).

Process (DB)

(1) In a case that the identity of a default downlink BWP (defaultDownlinkBWP-Id) is configured, an Active DL BWP is not a BWP indicated by defaultDownlinkBWP-Id, and an Active DL BWP is not BWP indicated by a dormant BWP identity (dormantBWP-Id), or in a case that defaultDownlinkBWP-Id of the default downlink BWP is not configured, an Active DL BW is not an initial downlink BWP (initialDownlinkBWP), and the Active DL BWP is not a BWP indicated by dormantBWP-ID, the MAC entity of the terminal apparatus performs (1) and (2) of the following process (DB-A).

(2) The MAC entity of the terminal apparatus performs the following process (DB-B) in a case that it receives a PDCCH for BWP switching and the Active DL BWP is switched.

Process (DB-A)

(1) In a case that a PDCCH addressed to C-RNTI or CS-RNTI indicating downlink assignment or an uplink grant has been received in an Active DL BWP, in a case that a PDCCH addressed to C-RNTI or CS-RNTI indicating downlink assignment or an uplink grant for an Active DL BWP has been received, or in a case that an MAC PDU has been transmitted in a configured uplink grant or an MAC PDU has been received in configured downlink assignment, the MAC entity of the terminal apparatus performs the following process (DB-A-1).

(2) In a case that the BWP deactivation timer related to the Active DL BWP expires, the MAC entity of the terminal apparatus performs the following process (DB-A-2).

Process (DB-A-1)

In a case that a random access procedure related to the serving cell is not being performed, or the random access procedure being performed and associated with the serving cell has been successfully completed by receiving the PDCCH addressed to C-RNTI, the BWP deactivation timer related to the Active DL BWP is started or restarted (in a case that the BWP deactivation timer is already started).
Process (DB-A-2)

In a case that defaultDownlinkBWP-Id has been configured, BWP switching to the BWP denoted by this defaultDownlinkBWP-Id is performed. Otherwise, BWP switching is performed to the initialDownlinkBWP.
Process (DB-B)

In a case that the switched Active DL BWP configured with defaultDownlinkBWP-Id is not the BWP denoted by dormantDownlinkBWP-Id and in a case that the switched Active DL BWP is not the BWP denoted by dormantDownlinkBWP-Id, the BWP deactivation timer related to the Active DL BWP is started or restarted (in a case that the BWP deactivation timer is already started).

In each activated serving cell for which a BWP has been configured, the MAC entity of the terminal apparatus performs some or all of the followings (A) to (H) in a case that the BWP has been activated (being an Active BWP) and the Active DL BWP in the serving cell is not a dormant BWP.
  (A) Transmit an UL-SCH in that BWP.
  (B) Transmit a RACH in that BWP in a case that a PRACH occasion has been configured.
  (C) Monitor the PDCCH in that BWP.
  (D) Transmit a PUCCH in that BWP in a case that the PUCCH has been configured.
  (E) Report a CSI in that BWP.
  (F) Transmit an SRS in the BWP in a case that the SRS has been configured.
  (G) Receive a DL-SCH in that BWP.
  (H) Initialize (again) all of suspended configured uplink grants of the grant type 1 configured with the Active BWP according to a stored configuration in a case that the stored configuration exists.

The MAC entity of the terminal apparatus performs some or all of the followings (A) to (I) in a case that the BWP is deactivated.
  (A) Transmit no UL-SCH in that BWP.
  (B) Transmit no RACH in that BWP.
  (C) Monitor no PDCCH in that BWP.
  (D) Transmit no PUCCH in that BWP.
  (E) Report no CSI in that BWP.
  (F) Transmit no SRS in that BWP.
  (G) Receive no DL-SCH in that BWP.
  (H) Clear all configured downlink assignments and/or all configured uplink grants of the grant type 2 configured in that BWP.
  (I) Suspend all configured uplink grants of the grant type 1 of the Inactive BWP.

Next, deactivation and activation of an SCG will be described.

Deactivation of an SCG may mean deactivating an SCG. In addition, deactivation of an SCG may mean that the MAC entity is related to the SCG and deactivates the cell group corresponding to the MAC entity. In addition, deactivation of an SCG may mean deactivation of a PSCell (SpCell of the SCG) or deactivation of a PSCell. Activation of an SCG may mean activating an SCG. In addition, activation of an SCG may mean that the MAC entity is related to the SCG and activates the cell group corresponding to the MAC entity. In addition, activation of an SCG may mean activation of a PSCell (SpCell of the SCG) or activation of a PSCell.

A deactivated state of an SCG in LTE and/or NR may be a state in which the terminal apparatus performs some or all of (A) to (P) of the following process (SD-1) in a PSCell (SpCell) of the SCG. Furthermore, the deactivated state of the SCG may mean a state in which the SCG is deactivated.
Process (SD-1)
  (A) Transmit no SRS in the PSCell.
  (B) Measure a CSI for the PSCell.
  (B) Report no CSI for the PSCell.
  (D) Transmit no PUCCH in the PSCell.
  (E) Transmit no UL-SCH in the PSCell.
  (F) Transmit no RACH in the PSCell.
  (G) Monitor no PDCCH of the PSCell.
  (H) Monitor no PDCCH for the PSCell.
  (I) Deactivate an Active BWP in the PSCell.
  (J) Perform discontinuous reception (DRX) in the PSCell.
  (K) Monitor no PDCCH of the PSCell and/or monitor no PDCCH for the PSCell, the PDCCH being addressed to C-RNTI, MCS-C-RNTI, and/or CS-RNTI indicating an uplink grant for transmission on the UL-SCH in the PSCell.
  (L) Monitor no PDCCH of the PSCell and/or monitor no PDCCH for the PSCell, the PDCCH being addressed to C-RNTI, MCS-C-RNTI, and/or CS-RNTI indicating an uplink grant in the BWP already activated in the PSCell.
  (M) Perform Automatic Gain Control (AGC), Beam Failure Detection (BFD) including beam failure recovery, and/or Radio Link Monitoring (RLM) in the PSCell.
  (N) Suspend some or all of the configured uplink grants of the grant type 1 associated with the PSCell.
  (O) Maintain timeAlignmentTimer (TAT) related to TAG (PTAG) including the PSCell.
  (P) Cause the MAC entity of the SCG to perform partial MAC reset.

(M) of the above-described process (SD-1) may be performed based on a parameter called bfd- and -RLM included in the configuration on the SCG side.

The (P) of the above-described process (SD-1) may include some or all of (A) to (O) of the above-described process (SD-1).

An activated state of an SCG in LTE and/or NR may be a state in which the terminal apparatus performs some or all of (A) to (O) of the following process (SA-1) in a PSCell (SpCell) of the SCG. Furthermore, the activated state of the SCG may mean a state in which the SCG is activated.
Process (SA-1)
  (A) Transmit an SRS in the PSCell.
  (B) Measure a CSI for the PSCell.
  (C) Report a CSI for the PSCell.
  (D) Transmit a PUCCH in the PSCell.
  (E) Transmit a UL-SCH in the PSCell.
  (F) Transmit a RACH in the PSCell.
  (G) Monitor the PDCCH of the PSCell.
  (H) Monitor the PDCCH for the PSCell.
  (I) Activate an Inactive BWP in the PSCell.
  (J) Perform discontinuous reception (DRX) in the PSCell.
  (K) Monitor the PDCCH of the PSCell and/or the PDCCH for the PSCell addressed to C-RNTI, MCS-C-RNTI, and/or CS-RNTI indicating an uplink grant for transmission on the UL-SCH in the PSCell.
  (L) Monitor the PDCCH of the PSCell and/or the PDCCH for the PSCell addressed to C-RNTI, MCS-C-RNTI, and/or CS-RNTI indicating an uplink grant in the BWP already activated in the PSCell.
  (M) Perform Automatic Gain Control (AGC), Beam Failure Detection (BFD) including beam failure recovery, and/or Radio Link Monitoring (RLM) in the PSCell.
  (H) Initialize (again) some or all of suspended configured uplink grants of the grant type 1 associated with the PSCell according to a stored configuration in a case that the stored configuration exists.
  (O) Maintain timeAlignmentTimer (TAT) related to TAG (PTAG) including the PSCell.

In LTE and/or NR, the terminal apparatus may determine that the SCG is in the deactivated state based on some or all of (A) to (H) of the following conditions (SD-2). Further, a base station apparatus may notify the terminal apparatus of the signaling or control elements of (A) to (F) of the following conditions (SD-2) via the SCG. Additionally or alternatively, the base station apparatus may notify the terminal apparatus of the signaling or control elements of (A) to (F) of the following conditions (SD-2) via a cell group other than the SCG (an MCG, an SCG other than the corresponding SCG, or the like).

Conditions (SD-2)
  (A) Reception of RRC signaling indicating deactivation of the SCG
  (B) Reception of an MAC CE indicating deactivation of the SCG
  (C) Reception of RRC signaling indicating deactivation of the PSCell
  (D) Reception of an MAC CE indicating deactivation of the PSCell
  (E) Reception of other RRC signaling
  (F) Reception of other MAC CE
  (G) Expiration of the SCG deactivation timer
  (H) Expiration of a PSCell deactivation timer The RRC signaling of (A), (C), and (E) of the above conditions (SD-2) may include a parameter of, for example, scg-State. In a case that scg-State is included in the RRC signaling, deactivation of the SCG is indicated, and in a case that scg-State is not included in the RRC signaling, activation of the SCG may be indicated. In addition, scg-State may be included in an RRC connection reconfiguration message, an RRC reconfiguration message, and/or an RRC resumption message. Further, the RRC signaling may be generated by a MN. In addition, the scg-State described above may not be included in RRC signaling generated by an SN. In this case, activation/deactivation of the SCG may not be determined based on whether scg-State is included in the RRC signaling for the RRC signaling generated by the SN.

In LTE and/or NR, the terminal apparatus may determine that the SCG is in the activated state based on some or all of (A) to (K) of the following conditions (SA-2). Further, the base station apparatus may notify the terminal apparatus of the signaling or control elements of (A) to (F) of the following conditions (SA-2) via the SCG. Additionally or alternatively, the base station apparatus may notify the terminal apparatus of the signaling or control elements of (A) to (F) of the following conditions (SA-2) via a cell group other than the SCG (an MCG, an SCG other than the corresponding SCG, or the like). In a case that the SCG is in an activated state, the SCG may not be in the deactivated state.

Conditions (SA-2)
  (A) Reception of RRC signaling indicating activation of the SCG
  (B) Reception of an MAC CE indicating activation of the SCG
  (C) Reception of RRC signaling indicating activation of the PSCell
  (D) Reception of an MAC CE indicating activation of the PSCell
  (E) Reception of other RRC signaling
  (F) Reception of other MAC CE
  (G) SCG deactivation timer
  (H) PSCell deactivation timer
  (I) Initiation of a random access procedure due to a scheduling request triggered to transmit the MAC PDU including an MAC SDU
  (J) Initiation of the random access procedure
  (K) Initiation of the random access procedure caused by the scheduling request (in other words, started by the MAC entity itself)

The RRC signaling of (A), (C), and (E) of the above conditions (SA-2) may indicate that, for example, the parameter of scg-State is not included in an RRC reconfiguration message and/or an RRC resumption message. Further, the RRC signaling may be generated by a MN.

The terminal apparatus that deactivates the SCG may perform some or all of (A) to (I) of the following process (SD-3) in the SCG.

Process (SD-3)
  (A) The SCG is considered to be deactivated.
  (B) Indicate to a lower layer (e.g., MAC entity) to deactivate the SCG.
  (C) In a case that the terminal apparatus is in the RRC-_CONNECTED state and the SCG is activated before signaling to indicate deactivation of the SCG is received, and in a case that the RB3 is configured before receiving an RRC reconfiguration message or an RRC connection reconfiguration message, and that the SRB3 has been not released according to RRC signaling for configuring any radio bearer (RadioBearerConfig) included in the RRC reconfiguration message or the RRC connection reconfiguration message, the performance of discarding of an SDU is triggered to a PDCP entity of the SRB3, and additionally or alternatively, an RLC entity of the SRB3 is reestablished.
  (D) Deactivate all SCells.
  (E) Consider all SCell deactivation timers related to SCell in the activated state to have expired
  (F) Consider all SCell deactivation timers related to SCell in the dormant state to have expired.
  (G) Start or restart no SCell deactivation timers associated with all SCells.
  (H) Disregard MAC CE that activates SCells. For example, the process (AD-1) is performed in a case that the MAC CE that activates the SCell is received in the process (AD) and deactivating the SCG is not indicated (or the SCG is not in the deactivated state).
  (I) Perform the process (AD-2). For example, the process (AD-2) is performed in a case that deactivation of the SCG is indicated (or the SCG is in the deactivated state) in the process (AD).

In a case that a higher layer (RRC entity or the like) indicates to the MAC entity of the terminal apparatus to deactivate the SCG based on (B) of the above-described process (SD-3), the MAC entity may deactivate all SCells of the SCG, and additionally or alternatively, it may deactivate PSCells based on the process (SD-1).

The terminal apparatus that activates the SCG may perform some or all of (A) to (D) of the following process (SA-3) in the SCG.

Process (SA-3)
  (A) Consider the SCG to be activated.
  (B) In a case that the SCG is configured to be in the deactivated state before the terminal apparatus receives signaling for indicating activation of the SCG, the terminal apparatus indicates to the lower layer (such as the MAC entity) to activate the SCG.
  (C) Perform process (AD-1) to activate all SCells.

(D) In a case that the activation of the SCG is performed based on RRC signaling, and in a case that the RRC signaling includes a parameter related to random access to a PSCell (SpCell), the random access procedure is initiated in the PSCell based on the notified parameter.

In a case that the MAC entity of the terminal apparatus indicates to the MAC entity such that the higher layer (the RRC entity or the like) activates the SCG based on (B) of the above process (SA-3), the SCG may be activated based on the above process (SA-1).

Figure 9:
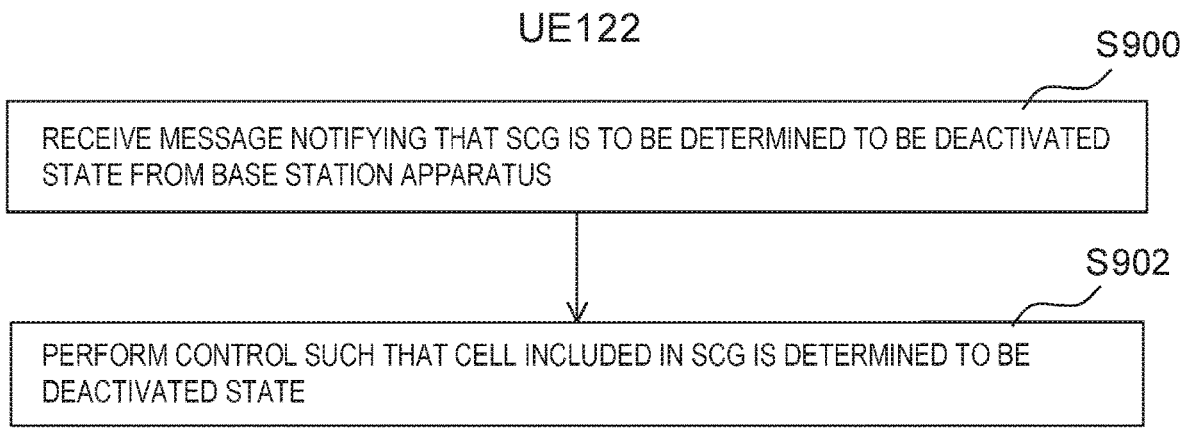
FIG. 9 illustrates an exemplary process of deactivation of SCG according to the present embodiment.

FIG. 9 is a diagram illustrating one example of the embodiment. In FIG. 9, the UE 122 receives a message (RRC signaling, an MAC CE, and the like) from the eNB 102 or the gNB 108 to give a notification of deactivation of the SCG (step S900). The UE 122 performs control such that the SCG is in the deactivated state based on the notification (step S902). In addition, in FIG. 9, the UE 122 receives a message (RRC signaling, an MAC CE, etc.) from the eNB 102 or the gNB 108 to give a notification of activation of the SCG (step S900). The UE 122 performs control such that the SCG is in the activated state based on the notification (step S902).

With the above-described operation, in the process of deactivating the SCG, a transmitter 504 of the UE 122 can make an efficient state change without independently transmitting the MAC CE to change the state of the cell of the SCG to the deactivated state. In addition, in a case that the deactivation of the SCG is performed based on RRC signaling, although configuration of an initial state is performed in the RRC layer and a state change is made in the MAC layer in the related art, with the above-described operation, the state change of the SCG can be efficiently performed while avoiding the mismatch between the indication by the RRC layer and the indication by the MAC layer.

Conditional reconfiguration will be described. A network may configure one or more candidate target SpCells for the terminal apparatus. A configuration parameter for each candidate target SpCell may be included in a conditional reconfiguration information element (ConditionalReconfiguration IE) of an RRC message and the terminal apparatus may be notified of the parameter by the base station apparatus. The terminal apparatus evaluates whether the execution condition linked to each configured candidate target SpCell (associated execution condition) is satisfied. The terminal apparatus may apply conditional reconfiguration linked to one of the candidate target SpCells satisfying the execution condition.

In accordance with the conditional reconfiguration information element included in the RRC Reconfiguration message, the terminal apparatus may configure one or more sets of information indicating execution conditions that need to be satisfied to trigger performance of the conditional reconfiguration (condExecutionCond or CondExecutionCondSN) and information indicating the RRC reconfiguration message applied in a case that the execution condition is satisfied (condRRCReconfig). The condRRCReconfig may be an RRC message including a configuration parameter for accessing a candidate target SpCell (RRC reconfiguration message). In addition, an identity (CondReConfigId) that can be linked to each of the one or more sets and identify each of the sets can be included in the conditional reconfiguration information element.

Further, in a case that a change of a PSCell to a candidate target SpCell of the same SN as the current SN (intra-SN CPC: intra-SN Conditional PSCell Change) is performed and no MN is engaged with the change of the PSCell, the RRC reconfiguration message that is notified with the condRRCReconfig and applied in a case that the execution condition is satisfied may be an RRC reconfiguration message generated by the SN.

Further, in a case that addition of a PSCell to a candidate target SpCell of the SN without current SN configuration (inter-SN CPA: inter-SN Conditional PSCell Addition) is performed, in a case that a change of a PSCell to a candidate target SpCell of an SN different from the current SN (inter-SN CPC: inter-SN Conditional PSCell Change) is performed, or in a case that intra-SN CPC is performed and an MN is engaged with the change of a PSCell, the RRC reconfiguration message that is notified with the condRRCReconfig and applied in a case that the execution condition is satisfied may be an RRC reconfiguration message generated by the MN. In this case, the configuration parameter for accessing the candidate target SpCell may be included in the information element (MRDC-SecondaryCellGroupConfig) in the RRC Reconfiguration message generated by the MN. Further, even in a case that intra-SN CPC is performed and no MN is engaged with the change of the PSCell, the RRC reconfiguration message that is notified with the condRRCReconfig and applied in a case that the execution condition is satisfied may be an RRC reconfiguration message generated by the MN.

Figure 5:
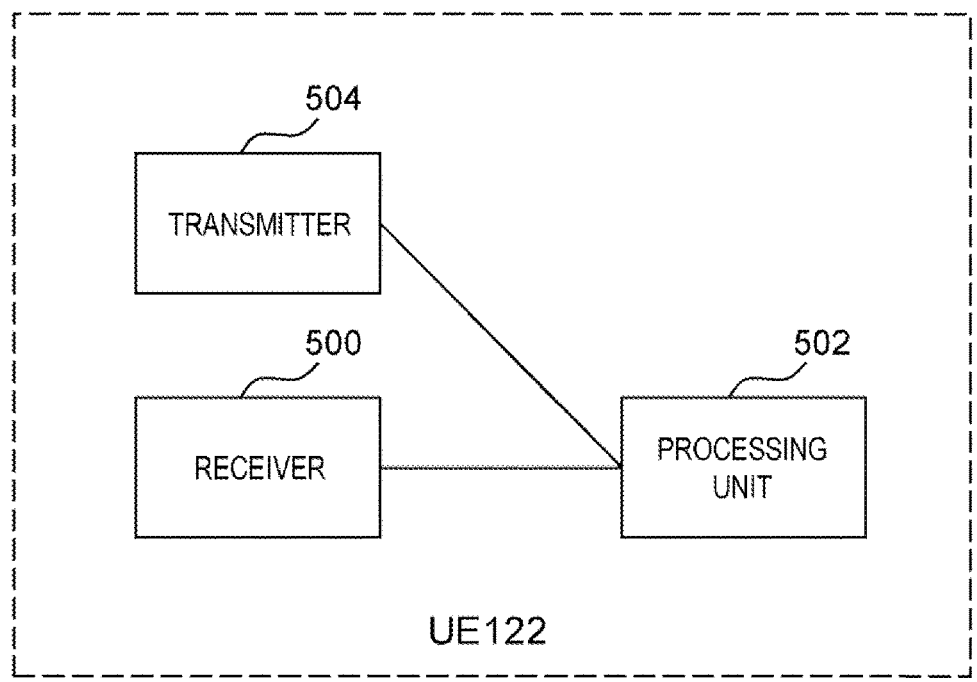
FIG. 5 is a block diagram illustrating a configuration of a terminal apparatus according to the present embodiment.

FIG. 5 is a block diagram illustrating a configuration of the terminal apparatus (UE 122) according to the present embodiment. Further, FIG. 5 illustrates only the main constituent parts closely related to the present embodiment in order to avoid complexity of description.

Various present embodiments will be described based on the foregoing description. Further, each process described above may be applied to each process to be omitted in the following description.

FIG. 5 is a block diagram illustrating a configuration of the terminal apparatus (UE 122) according to the present embodiment. Further, FIG. 5 illustrates only the main constituent parts closely related to the present embodiment in order to avoid complexity of description.

The UE 122 illustrated in FIG. 5 includes a receiver 500 that receives control information (DCI, MAC CE, RRC signaling, etc.) from a base station apparatus, a processing unit 502 that performs a process using a parameter included in the received control information, and the received control information transmitter 504 that transmits control information (UCI, MAC CE, RRC signaling, etc.) to the base station apparatus. The above-described base station apparatus may be the eNB 102 or the gNB 108. In addition, the processing unit 502 may include some or all of the functions of the various layers (e.g., the physical layer, the MAC layer, the RLC layer, the PDCP layer, the SDAP layer, the RRC layer, and the NAS layer). In other words, the processing unit 502 may include some or all of a physical layer processing unit, an MAC layer processing unit, an RLC layer processing unit, a PDCP layer processing unit, an SDAP processing unit, an RRC layer processing unit, and a NAS layer processing unit.

Figure 6:
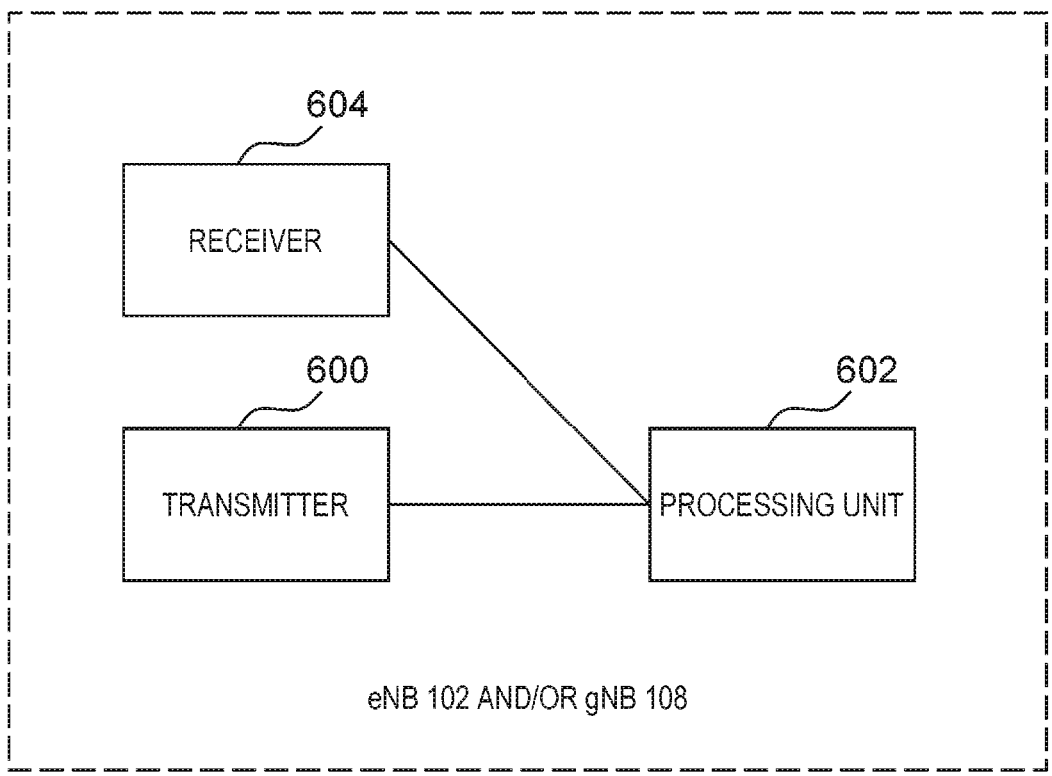
FIG. 6 is a block diagram illustrating a configuration of a base station apparatus according to the present embodiment.

FIG. 6 is a block diagram illustrating a configuration of the base station apparatus according to the present embodiment. Further, FIG. 6 illustrates only the main constituent parts closely related to the present embodiment in order to avoid complexity of description. The above-described base station apparatus may be the eNB 102 or the gNB 108.

The base station apparatus illustrated in FIG. 6 includes a transmitter 600 that transmits control information (DCI, MAC CE, RRC signaling, etc.) to the UE 122, a processing unit 602 that creates controls information (DCI, MAC CE, RRC signaling, etc.) and transmits the control information to the UE 122 to cause the processing unit 502 of the UE 122 to perform a process, and a receiver 604 that receives control information (UCI, MAC CE, RRC signaling, etc.) from the UE 122. In addition, the processing unit 602 may include some or all of the functions of the various layers (e.g., the physical layer, the MAC layer, the RLC layer, the PDCP layer, the SDAP layer, the RRC layer, and the NAS layer). In other words, the processing unit 602 may include some or all of a physical layer processing unit, an MAC layer processing unit, an RLC layer processing unit, a PDCP layer processing unit, an SDAP processing unit, an RRC layer processing unit, and a NAS layer processing unit.

An exemplary process of the terminal apparatus in the present embodiment will be described with reference to FIG. 10.

Figure 10:
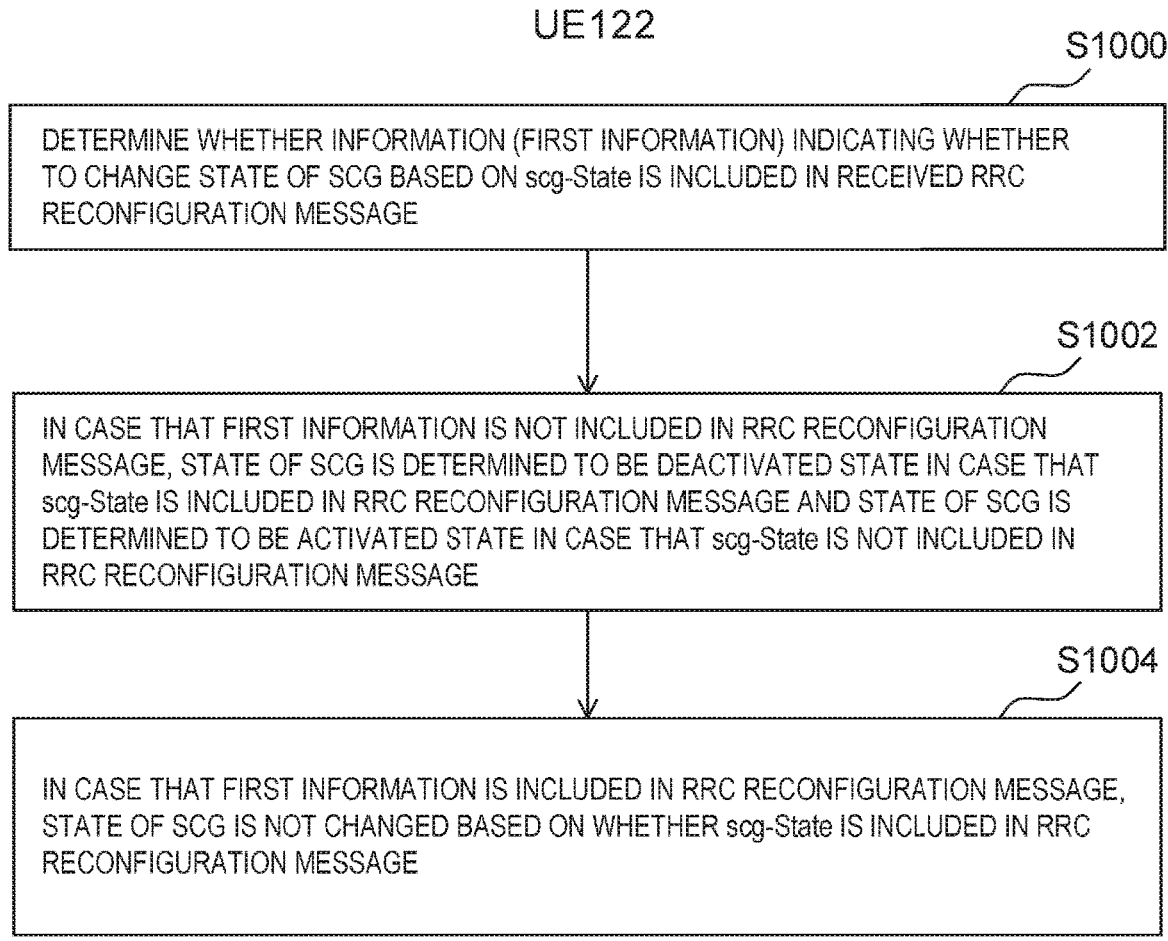
FIG. 10 illustrates an exemplary process of activation/deactivation of SCG according to the present embodiment.

FIG. 10 is a flowchart illustrating an exemplary process of the terminal apparatus according to the present embodiment. The processing unit 502 of the UE 122 determines whether information (first information) indicating whether to change the state of the SCG based on the information indicating the state configuration of the secondary cell group (here, referred to as scg-State) is included in the received RRC reconfiguration message (step S1000). In a case that the first information is not included the RRC reconfiguration message, the processing unit 502 in the UE 122 determines the state of the SCG to a deactivated state in a case that scg-State is included in the RRC reconfiguration message and determines the state of the SCG to an activated state in a case that scg-State is not included in the RRC Reconfiguration message (step S1002). In a case that the first information is included in the RRC reconfiguration message, the processing unit 502 of the UE 122 does not change the state of the SCG based on whether scg-State is included in the RRC reconfiguration message (step S1004).

FIG. 11 illustrates exemplary ASN.1 of an RRC reconfiguration message. As illustrated in FIG. 11, the RRC reconfiguration message (RRCReconfiguration) may include scg-State and/or first information (here, referred to as keepScgState). Further, the first information may be an ENUMERATED type having multiple values. In this case, the terminal apparatus may determine whether a specific value has been configured in the first information, and may determine whether to change the state of the SCG based on whether scg-State is included based on the determination. In addition, the first information may be a BOOLEAN type with a true or false value. In this case, the terminal apparatus may determine whether the first information is true or false, and may determine whether to change the state of the SCG based on whether scg-State is included based on the determination.

Further, "Does not change the state of the SCG" in step S1004 described above may be determination of the UE 122 to determine the SCG to be in the activated state in a case that the SCG is in the activated state before receiving the RRC reconfiguration message including the first information. Additionally or alternatively, "Does not change the state of the SCG" in step S1004 described above may be determination of the UE 122 to determine the SCG to be in the deactivated state in a case that the SCG is in the deactivated state before receiving the RRC reconfiguration message.

In addition, the first information may be information included in conditional reconfiguration information elements for conditional reconfiguration. For example, the first information may be information linked to each of CondReConfigId. In this case, in a case that the first information linked to CondReconfigId exists, the RRC reconfiguration message linked to the CondReconfigid and applied in a case that the execution condition is satisfied may be considered to include the first information.

FIG. 12 illustrates exemplary ASN.1 of an RRC reconfiguration message including conditional reconfiguration information elements for conditional reconfiguration. As illustrated in FIG. 12, the RRC reconfiguration message (RRCReconfiguration) may include a conditional reconfiguration information element (ConditionalReconfiguration information element). The ConditionalReconfiguration information element may include a CondReconfigToAddModList information element. The CondReconfigToAddModList information element may be a list of conditional reconfiguration (CondReConfigToAddMod information element) for adding or modifying entries including condReConfigId, and condExecutionCond (or condExecutionCondSN) and condRRCReconfig linked to the condReConfigId. The CondReconfigToAddMod information element may include condReconfigId, condExecutionCond (or condExecutionCondSN) and condRRCReconfig linked to the condReconfigId. Furthermore, the CondReconfigToAddMod information element may include the first information (here, keepScgState). Further, the first information may be ENUMERATED type. In this case, the terminal apparatus may determine whether the first information is included in the CondReconfigToAddMod information element, and based on this determination, determine whether to change the state of the SCG based on whether the scg-State is included in a case that condRRCReconfig included in the CondReconfigToAddMod information element is applied. In addition, the first information may be a BOOLEAN type with a true or false value. In this case, the terminal apparatus may determine whether the first information is true or false, and based on this determination, may determine whether to change the state of the SCG based on whether scg-State is included in a case that condRRCReconfig included in the CondReconfigToAddMod information element is applied.

In addition, for example, the first information may be a list of some or all of CondReconfigId. In this case, the first information may be considered to be included in the RRC reconfiguration message linked to CondReconfigId included in the list and applied in a case that the execution condition is satisfied. Further, it may be determined that the first information is not included in the RRC reconfiguration message linked to CondReconfigId included in the list and applied in a case that the execution condition is satisfied as another execution method.

FIG. 13 illustrates exemplary ASN.1 of an RRC reconfiguration message including conditional reconfiguration information elements for conditional reconfiguration. As illustrated in FIG. 13, the RRC reconfiguration message (RRCReconfiguration) may include a conditional reconfiguration information element (ConditionalReconfiguration information element). The ConditionalReconfiguration information element may include a CondReconfigToAddModList information element. The CondReconfigToAddModList information element may be a list of conditional reconfiguration (CondReConfigToAddMod information element) for adding or modifying entries composed of condReConfigId, and condExecutionCond (or condExecutionCondSN) and condRRCReconfig linked to the condReConfigId. The CondReconfigToAddMod information element may include condReconfigId, condExecutionCond (or condExecutionCondSN) and condRRCReconfig linked to the condReconfigId. Furthermore, the ConditionalReconfiguration information element may include the first information (here, KeepScgStateList information element).

The first information may be a list of CondReConfigId. In this case, in a case that condRRCReconfig included in the CondReconfigToAddMod information element is applied, the terminal apparatus may determine whether the CondReconfigId of the CondReconfigToAddMod information element is an identity included in the KeepScgStateList information element, and determine whether to change the state of the SCG based on whether scg-Statetate is included based on the above determination.

Furthermore, the above-mentioned RRC reconfiguration message may be an RRC connection reconfiguration message or another RRC signaling.

In this manner, in the present embodiment, the UE 122 can determine whether to change the state of the SCG based on signaling notified from the base station apparatus, and then even in a case that an RRC reconfiguration message is configured for the UE 122 in advance, for example, in conditional reconfiguration, or the like, the UE 122 can configure an appropriate state of the SCG in a case that RRC reconfiguration is performed.

An exemplary process of the terminal apparatus in the present embodiment will be described with reference to FIG. 14.

Figures 14, 15:
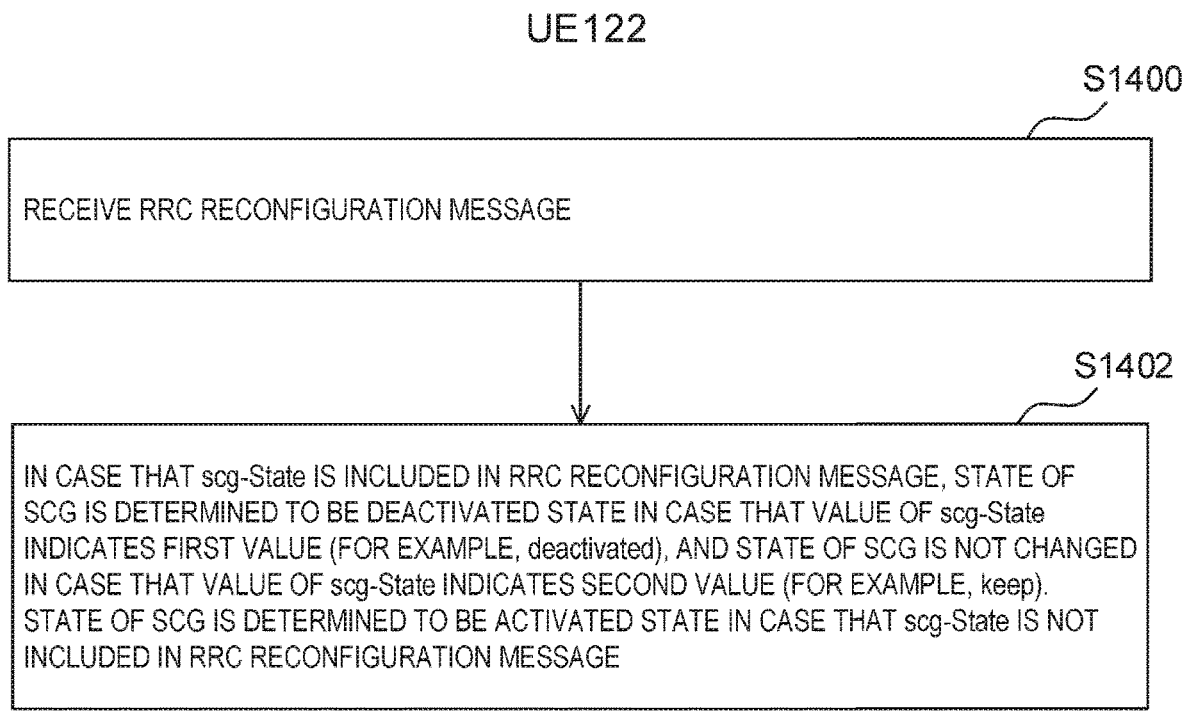
FIG. 14 illustrates an exemplary process of activation/deactivation of SCG according to the present embodiment.
FIG. 15 illustrates an exemplary description of ASN.1 of an RRC reconfiguration message according to the present embodiment.

FIG. 14 is a flowchart illustrating an exemplary process of the terminal apparatus according to the present embodiment. The processing unit 502 of the UE 122 receives an RRC reconfiguration message (step S1400). In a case that information indicating state configuration of a secondary cell group (here referred to as scg-State) is included in the RRC reconfiguration message, the processing unit 502 of the UE 122 determines the state of the SCG to be the deactivated state in a case that the value of scg-State indicates a first value (e.g., deactivated), and does not change the state of the SCG in a case that the value of scg-State indicates a second value (e.g., keep). The processing unit 502 of the UE 122 determines the state of the SCG to be the activated state in a case that scg-State is not included in the RRC reconfiguration message (step S1402).

Further, other conditions may be considered in step S1402 described above. For example, the step S1402 described above may be performed in a case that scg-State is not included any of the information element to be configured on the SCG side (MRDC-SecondaryCellGroup), an E-UTRA RRC connection reconfiguration message (RRCConnection-Reconfiguration), and an E-UTRA RRC connection resume message (RRCConnectionResume).

Further, "Does not change the state of the SCG" in step S1402 described above may be determination of the UE 122 to determine the SCG to be in the activated state in a case that the SCG is in the activated state before receiving the RRC reconfiguration message. Additionally or alternatively, "Does not change the state of the SCG" in step S1402 described above may be determination of the UE 122 to determine the SCG to be in the deactivated state in a case that the SCG is in the deactivated state before receiving the RRC reconfiguration message.

FIG. 15 illustrates exemplary ASN.1 of an RRC reconfiguration message. As illustrated in FIG. 15, the RRC reconfiguration message (RRCReconfiguration) may include scg-State. Further, the terminal apparatus may not change the state of the SCG based on the fact that scg-State is included and the value thereof has been kept, and may determine that the state of the SCG is in the deactivated state based on the fact that the value thereof is deactivated. In addition, the terminal apparatus may determine that the state of the SCG is in the activated state based on the fact that scg-State is not included.

The above-mentioned RRC reconfiguration message may be an RRC connection reconfiguration message or another RRC signaling. In addition, the terminal apparatus may be notified of the above-mentioned conditional reconfiguration information elements as multiple independent parameters. For example, the terminal apparatus may be configured with any of, a combination of, or all of the above-mentioned conditional reconfiguration information elements including (A) configuration for performing conditional reconfiguration (that is, Conditional Handover) for changing a PCell, (B) configuration for performing conditional reconfiguration to add or change a PSCell (that is, Conditional PSCell addition/change), and (C) configuration for performing conditional reconfiguration to add or change a continuously used PSCell (that is, Continuous Conditional PSCell addition/change).

In this manner, in the present embodiment, the UE 122 can determine whether the state of the SCG is determined to be an activated state, a deactivated state, or is not to be changed based on signaling notified from the base station apparatus, and then even in a case that an RRC reconfiguration message is configured for the UE 122 in advance, for example, in conditional reconfiguration, or the like, the UE 122 can configure an appropriate state of the SCG in a case that RRC reconfiguration is performed.

The radio bearer in the above description may be a DRB, an SRB, or a DRB and an SRB unless otherwise stated.

In the above description, the expressions such as "notified" "receive an indication", and the like may be paraphrased as one another.

In the above description, the expressions such as "linked", "associated", "related", and the like may be paraphrased as one another.

In the above description, the expressions such as "included" "being included", "has been included", and the like may be paraphrased as one another.

In the above description, "the" may be paraphrased as "the above-described".

In the above description, "SpCell of an SCG" may be paraphrased as "PSCell".

In the above description, the expressions such as "confirmed to be" "being configured", "included", and the like may be paraphrased as one another.

In the above description, the "dormant state" may be paraphrased as the "deactivated state", and a "state resulting from resuming from the dormant state" may be paraphrased as the "activated state". In the above description, "activated" and "deactivated" may be paraphrased as "activated state" and "deactivated state", respectively.

In the above description, "transit from X to Y" may be paraphrased as "become Y from X". In the above description, "caused to transit" may be paraphrased as "determine a transition".

In addition, some or all of the steps in each exemplary process or the exemplary flow of each process in the above description may not be performed. In addition, the order of the steps in each exemplary process or the exemplary flow of each process in the above description may vary. In addition, some or all of process in each step in each exemplary process or the exemplary flow of each process in the above description may not be performed. In addition, the order of the processes in each step in each exemplary process or the exemplary flow of each process in the above description may vary. In addition, in the above description, "perform B based on being A" may be paraphrased as "perform B. That is, "perform B" may be performed independently of "being A".

Further, in the above description, "A may be paraphrased as B" may include the meaning that B is paraphrased as A in addition to the meaning that A is paraphrased as B. In addition, the description "C may be D" and "C may be E" above may include "D may be E". In addition, the description "F may be G" and "G may be H" above may include "F may be H".

In addition, in the above description, in a case that a condition "A" conflicts a condition "B", the condition "B" may be expressed as "another" condition of the condition "A".

A program running on an apparatus related to the present embodiment may serve as a program that controls a Central Processing Unit (CPU) and the like to cause a computer to operate in such a manner as to implement the functions in the present embodiment. Programs or the information handled by the programs are temporarily loaded into a volatile memory such as a Random Access Memory (RAM) while being processed, or stored in a non-volatile memory such as a flash memory, or a Hard Disk Drive (HDD), and then read, modified, and written by the CPU, as necessary.

Further, the apparatuses of the above-described embodiment may be partially implemented by a computer. In such a case, a program for implementing such control functions may be implemented by being recorded on a computer-readable recording medium to cause a computer system to read and execute the program recorded on this recording medium. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the above-described program may be configured to realize some of the functions described above, and additionally may be configured to realize the functions described above, in combination with a program already recorded in the computer system.

Furthermore, each functional block or various characteristics of the apparatuses used in the above-described embodiments may be implemented or performed with an electric circuit, that is, typically an integrated circuit or multiple integrated circuits. An electric circuit designed to perform the functions described in the present specification may include a general-purpose processor, a digital signal processor (DSP), an application specific integrated circuit (ASIC), a field programmable gate array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or the above-mentioned circuits may include a digital circuit, or may include an analog circuit. Furthermore, in a case that with advances in semiconductor technology, a circuit integration technology appears that replaces the present integrated circuits, it is also possible to use an integrated circuit based on the technology.

Further, the present embodiment is not limited to the above-described embodiments. Although apparatuses have been described as an example in the embodiment, the present embodiment is not limited to these apparatuses, and is applicable to a stationary type or a non-movable type electronic equipment installed indoors or outdoors such as a terminal apparatus or a communication apparatus of, for example, AV equipment, kitchen equipment, a cleaning or washing machine, air-conditioning equipment, office equipment, a vending machine, and other household appliances.

Although the embodiments have been described in detail referring to the drawings, the specific configuration is not limited to the embodiments and includes, for example, design changes within the scope not departing from the gist of the embodiments. Furthermore, various modifications are possible within the scope of the present embodiments defined by claims, and embodiments that are made by suitably combining technical means disclosed according to the different embodiments are also included in the technical scope of the present embodiments of the present invention. In addition, a configuration in which components, which are described in the embodiment described above, having similar effects are interchanged is also included in the present invention.

REFERENCE SIGNS LIST

100 E-UTRA
102 eNB
104 EPC
106 NR
108 gNB
110 5GC
112, 114, 116, 118, 120, 124 Interface
122 UE
200, 300 PHY
202, 302 MAC
204, 304 RLC
206, 306 PDCP
208, 308 RRC
310 SDAP
210, 312 NAS
500, 604 Receiver
502, 602 Processing unit
504, 600 Transmitter

The invention claimed is:

1. A terminal apparatus comprising:
a receiver configured to receive RRC signaling; and
a processing unit,
wherein the processing unit determines whether information (first information) indicating whether a state of a secondary cell group is to be changed based on information (scg-State) indicating configuration of a state of the secondary cell group is included in the RRC signaling,
in a case that the first information is not included in the RRC signaling, the state of the secondary cell group is determined to be a deactivated state based on the scg-State being included in the RRC signaling, and the state of the secondary cell group is determined to be an activated state based on the scg-State not being included in the RRC signaling, and
in a case that the first information is included in the RRC signaling, the state of the secondary cell group is not changed based on whether the scg-State is included in the RRC signaling.

2. A base station apparatus for communicating with a terminal apparatus, the base station apparatus comprising:
a transmitter configured to transmit RRC signaling; and
a processing unit,
wherein the terminal apparatus is notified that a state of a secondary cell group is to be determined to be a deactivated state based on first information not being included and scg-State being included in the RRC signaling,
the terminal apparatus is notified that a state of the secondary cell group is to be determined to be an activated state based on the first information not being included and the scg-State not being included in the RRC signaling, and
the terminal apparatus is notified that a state of the secondary cell group is not to be changed based on the first information being included in the RRC signaling.

3. A method applied to a terminal apparatus, the method comprising:
receiving RRC signaling; and
processing the RRC signaling,
wherein it is determined whether information (first information) indicating whether a state of a secondary cell group is to be changed based on information (scg-State) indicating configuration of a state of the secondary cell group is included in the RRC signaling,
in a case that the first information is not included in the RRC signaling, the state of the secondary cell group is determined to be a deactivated state based on the scg-State being included in the RRC signaling, and the state of the secondary cell group is determined to be an activated state based on the scg-State not being included in the RRC signaling, and
in a case that the first information is included in the RRC signaling, the state of the secondary cell group is not changed based on whether the scg-State is included in the RRC signaling.

* * * * *